US010077412B2

(12) United States Patent
Yamamoto et al.

(10) Patent No.: US 10,077,412 B2
(45) Date of Patent: Sep. 18, 2018

(54) VISCOSITY MODIFIER FOR LUBRICATING OILS, ADDITIVE COMPOSITION FOR LUBRICATING OILS, AND LUBRICATING OIL COMPOSITION

(71) Applicants: MITSUI CHEMICALS, INC., Tokyo (JP); THE LUBRIZOL CORPORATION, Wickliffe, OH (US)

(72) Inventors: Atsushi Yamamoto, Chiba (JP); Terufumi Suzuki, Ichihara (JP); Kenta Ide, Singapore (SG); Chor Huang, Wickliffe, OH (US)

(73) Assignees: MITSUI CHEMICALS, INC., Tokyo (JP); THE LUBRIZOL CORPORATION, Wickliffe, OH (US)

( * ) Notice: Subject to any disclaimer, the term of this patent is extended or adjusted under 35 U.S.C. 154(b) by 0 days.

(21) Appl. No.: 15/127,698

(22) PCT Filed: Mar. 27, 2015

(86) PCT No.: PCT/US2015/022926
§ 371 (c)(1),
(2) Date: Sep. 20, 2016

(87) PCT Pub. No.: WO2015/148889
PCT Pub. Date: Oct. 1, 2015

(65) Prior Publication Data
US 2017/0175028 A1 Jun. 22, 2017

Related U.S. Application Data

(60) Provisional application No. 61/971,980, filed on Mar. 28, 2014.

(51) Int. Cl.
C10M 157/00 (2006.01)
C10M 143/06 (2006.01)
C10M 145/14 (2006.01)

(52) U.S. Cl.
CPC ........ *C10M 143/06* (2013.01); *C10M 145/14* (2013.01); *C10M 2205/026* (2013.01); *C10M 2209/084* (2013.01); *C10N 2230/02* (2013.01)

(58) Field of Classification Search
CPC .................................................. C10M 2205/02
(Continued)

(56) References Cited

U.S. PATENT DOCUMENTS 2,501,731 A 3/1950 Mertes
2,616,905 A 11/1952 Asseff et al.
(Continued)

FOREIGN PATENT DOCUMENTS

EP 1 561 798 A1 8/2005
JP 2003-105365 A 4/2003
(Continued)

OTHER PUBLICATIONS

International Search Report and Written Opinion of the International Searching Authority issued in International Patent Application No. PCT/US2015/022926 dated Jun. 10, 2015.

*Primary Examiner* — Vishal Vasisth
(74) *Attorney, Agent, or Firm* — Foley & Lardner LLP

(57) ABSTRACT

Provided are a viscosity modifier for lubricating oils for obtaining an additive composition for lubricating oils having excellent fluidity in a wide temperature range from low temperature to high temperature; and said additive composition for lubricating oils. Further provided are a viscosity modifier for lubricating oils for obtaining a lubricating oil composition capable of reducing viscosity in good balance in a wide temperature range from low temperature to high temperature; and said lubricating oil composition. The viscosity modifier for lubricating oils includes an ethylene α-olefin copolymer (A) which includes 30 to 50 mole % of structural units derived from at least one α-olefin selected
(Continued)

from α-olefins having 4 and 5 carbon atoms and 50 to 70 mole % of structural units derived from ethylene (with the proviso that the total of all structural units of said copolymer is 100 mole %) and which satisfies specific requirements (a), (b), and (c).

4 Claims, 3 Drawing Sheets

(58) Field of Classification Search
USPC .......................................................... 508/473
See application file for complete search history.

(56) References Cited

U.S. PATENT DOCUMENTS

| | | |
|---|---|---|
| 2,616,911 A | 11/1952 | Asseff et al. |
| 2,616,925 A | 11/1952 | Asseff et al. |
| 2,777,874 A | 1/1957 | Asseff et al. |
| 3,172,892 A | 3/1965 | Le Suer et al. |
| 3,256,186 A | 6/1966 | Greenwald |
| 3,318,809 A | 5/1967 | Bray |
| 3,320,162 A | 5/1967 | Axe et al. |
| 3,365,396 A | 1/1968 | Schlicht |
| 3,381,022 A | 4/1968 | Le Suer |
| 3,384,585 A | 5/1968 | Gragson et al. |
| 3,488,284 A | 1/1970 | Lesuer et al. |
| 3,629,109 A | 12/1971 | Gergel et al. |
| 3,634,515 A | 1/1972 | Piasek et al. |
| 4,234,435 A | 11/1980 | Meinhardt et al. |
| 4,285,822 A | 8/1981 | Devries et al. |
| 4,654,403 A | 3/1987 | Tipton |
| 6,200,936 B1 | 3/2001 | Moreton |
| 6,310,009 B1 | 10/2001 | Kocsis et al. |
| 6,399,549 B1 | 6/2002 | Taylor et al. |
| 6,559,105 B2 | 5/2003 | Abraham et al. |
| 2002/0035044 A1 | 3/2002 | Okada et al. |
| 2002/0055445 A1 | 5/2002 | Okada et al. |
| 2002/0107153 A1 | 8/2002 | Taylor et al. |
| 2006/0122079 A1 | 6/2006 | Kaneshige et al. |
| 2007/0249508 A1 | 10/2007 | Matsuda et al. |
| 2009/0023619 A1* | 1/2009 | Kaneshige ........... C10M 107/02 508/473 |
| 2012/0190601 A1 | 7/2012 | Ikeda et al. |

FOREIGN PATENT DOCUMENTS

| | | |
|---|---|---|
| WO | WO-00/34420 A1 | 6/2000 |
| WO | WO-00/60032 A1 | 10/2000 |
| WO | WO-01/56968 A1 | 8/2001 |
| WO | WO-2006/028169 A1 | 3/2006 |
| WO | WO-2011/037585 A1 | 3/2011 |
| WO | WO-2011/038331 A1 | 3/2011 |

* cited by examiner

Fig. 1
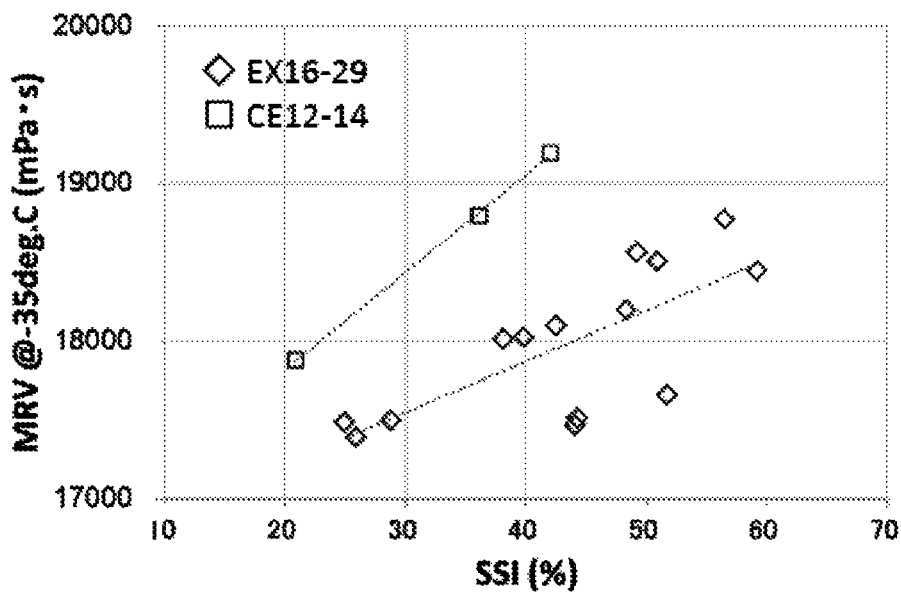
Fig. 1
Fig. 2
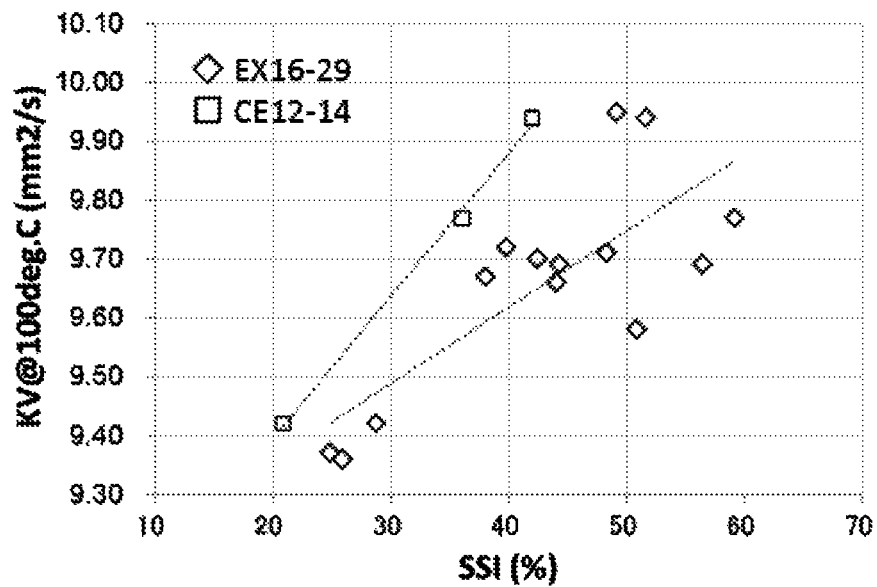
Fig. 2

Fig. 3
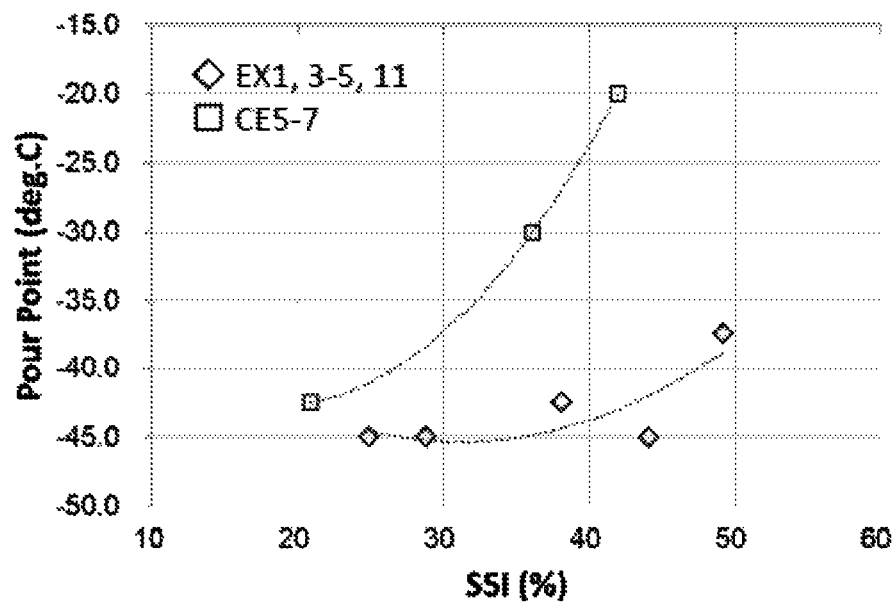
Fig. 3
Fig. 4
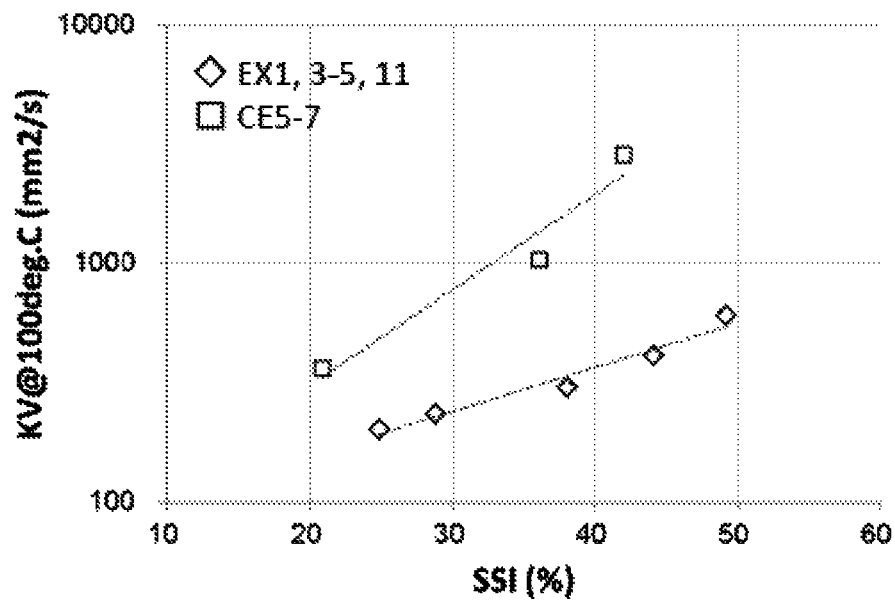
Fig. 4

VISCOSITY MODIFIER FOR LUBRICATING OILS, ADDITIVE COMPOSITION FOR LUBRICATING OILS, AND LUBRICATING OIL COMPOSITION

CROSS-REFERENCE TO RELATED APPLICATIONS

This application is a U.S. national stage application claiming the benefit of International Patent Application No. PCT/US2015/022926, filed Mar. 27, 2015, which claims the priority benefits of U.S. provisional patent application 61/971,980, filed Mar. 28, 2014, the entire contents of which are incorporated herein by reference.

TECHNICAL FIELD

The present invention relates to a viscosity modifier for lubricating oils, an additive composition for lubricating oils, and a lubricating oil composition.

BACKGROUND ART

Petroleum products have so-called temperature dependence of viscosity wherein a large variation in viscosity is exhibited with variation in temperature. For example, for lubricating oil compositions used for automobiles or the like, it is preferable that the temperature dependence of viscosity is small. Therefore, in order to decrease the temperature dependence of viscosity, a certain kind of polymer which is soluble in a lubricating oil base is used in lubricating oil as a viscosity modifier.

Ethylene•α-olefin copolymers are widely used as viscosity modifiers for lubricating oils, and various improvements have been made in order to further improve the balance of performances of the lubricating oils (for example, see patent Document 1).

In recent years, in view of the reduction of petroleum resources and environmental problems such as global warming, an improvement of fuel efficiency of automobiles which is aimed at reducing exhaust gas pollutants and $CO_2$ emissions is required. Lowering of fuel consumption by lubricating oils is expected as a significant technology for lowering fuel consumption because of having excellent cost-effectiveness as compared to physical modification of the lubricated machinery, and the requirement for improving fuel efficiency by lubricating oils is growing.

The power loss in an engine or transmission is divided into friction loss at a sliding part and agitation loss due to the viscosity of lubricating oil. In particular, reduction of viscosity resistance is one measure of lowering fuel consumption by engine oils. In recent years, fuel consumption is tested based on performance under conditions of comparatively low temperatures as well as that under conventional conditions of high temperatures, and thus reduction of viscosity resistance in a wide temperature range from low temperature to high temperature is desirable for improving fuel efficiency.

Lowering viscosity is effective for the reduction of viscosity resistance of an engine oil. In particular, at a low temperature, reducing viscosity is effective for the reduction of both friction loss and agitation loss. However, this does not mean that the viscosity should be simply lowered, because abrasion is caused at a sliding part at a high temperature. In other words, it is desired that the viscosity is lowered as much as possible in order to reduce agitation loss at a non-sliding part while a certain minimum required viscosity is ensured to avoid abrasion at a sliding part.

In order to reduce low-temperature viscosity, it is known to use a polymer as described in Patent Document 1, wherein the polymer dissolves in base oil and provides excellent thickening properties at a high temperature, while the solubility of the polymer in oil is decreased at a low temperature, and thereby its effective volume (flow volume) and impact on viscosity are decreased.

Also, a viscosity modifier for lubricating oils comprising an ethylene/α-olefin copolymer containing a structural unit derived from ethylene and a structural unit derived from two or more kinds of α-olefins is known (for example, see Patent Document 2).

The viscosity modifiers described in Patent Literatures 1 to 3 cause reduction in the low-temperature viscosity of a lubricating oil composition containing each of said modifiers and make a certain contribution to improvement of fuel efficiency under the condition of a low temperature in an engine (for examples, at the time of starting the engine). However, lowering of fuel consumption is increasingly required, and further reduction of low-temperature viscosity is thus demanded. Although improvement of fuel efficiency under the condition of a high temperature in an engine is also demanded, and high-temperature viscosity is increasingly reduced by lowering the viscosity of base oil, it is inferred that there is a limit to reduction in viscosity from the viewpoint of prevention of abrasion. In such circumstances, a viscosity modifier capable of reducing viscosity in good balance in a wide temperature range from low temperature to high temperature is demanded.

Since the additive compositions for lubricating oils described in Patent Documents 1 and 2 often have high viscosity, an improvement of fluidity in a wide temperature range from low temperature to high temperature is demanded from the viewpoint of an improvement of the efficiency of workability and transportability as well as reduction of the energy consumption of production facilities.

CITATION LIST

Patent Documents

[Patent Document 1] International Publication WO 2000/034420
[Patent Document 2] International Publication WO 2006/028169
[Patent Document 3] International Publication WO 2011/038331

SUMMARY OF THE INVENTION

Problems to be Solved by the Invention

It is an object of the present invention to provide a viscosity modifier for lubricating oils for obtaining an additive composition for lubricating oils having excellent fluidity in a wide temperature range from low temperature to high temperature. Further, it is an object of the present invention to provide a viscosity modifier for lubricating oils for obtaining a lubricating oil composition capable of reducing viscosity in good balance in a wide temperature range from low temperature to high temperature.

It is an object of the present invention to provide an additive composition for lubricating oils having excellent fluidity in a wide temperature range from low temperature to high temperature.

It is an object of the present invention to provide a lubricating oil composition capable of reducing viscosity in good balance in a wide temperature range from low temperature to high temperature.

Means for Solving the Problems

As a result of intensive investigation, the present inventors found that an additive composition for lubricating oils having excellent fluidity in a wide temperature range from low temperature to high temperature as compared to a conventional additive composition for lubricating oils is obtained by using a viscosity modifier for lubricating oils containing a specific ethylene•α-olefin copolymer in an additive composition for lubricating oils. Further, it was found that a lubricating oil composition capable of reducing viscosity in good balance in a wide temperature range from low temperature to high temperature as compared to a conventional lubricating oil composition is obtained by using a viscosity modifier for lubricating oils containing a specific ethylene•α-olefin copolymer in a lubricating oil composition.

The viscosity modifier for lubricating oils of the present invention comprises an ethylene•α-olefin copolymer (A) which comprises 30 to 50 mole % of structural units derived from at least one α-olefin selected from α-olefins having 4 and 5 carbon atoms and 50 to 70 mole % of structural units derived from ethylene with the proviso that the total of all structural units of said copolymer is 100 mole % and which satisfies the following requirements (a), (b), and (c):

(a): A glass transition temperature (Tg) as measured by differential scanning calorimetry (DSC) is in a range of −75 to −65° C.

(b): A melting point (Tm) as measured by differential scanning calorimetry (DSC) is not substantially observed or is not a melting point (Tm) of −25° C. or more.

(c): Intrinsic viscosity [η] as measured in a decalin solvent at 135° C. is 1.0 to 2.8 dl/g.

The weight average molecular weight of the ethylene•α-olefin copolymer (A) is preferably 100,000 to 400,000 as measured by gel permeation chromatography (GPC).

The ethylene•α-olefin copolymer preferably comprises 1-butene as a structural unit.

An additive composition for lubricating oils of the present invention comprises the viscosity modifier for lubricating oils and an oil (B) and comprises the ethylene•α-olefin copolymer (A) and said oil (B) at a weight ratio (A)/(B) of 1/99 to 50/50.

A lubricating oil composition of the present invention comprises the viscosity modifier for lubricating oils and a lubricating oil base (BB), and the ethylene•α-olefin copolymer (A) in an amount of 0.1 to 5% by weight is contained in 100% by weight of said lubricating oil composition.

It is preferable that in the lubricating oil composition of the present invention, 0.05 to 5% by weight of a pour-point depressant (C) is further contained in 100% by weight of said lubricating oil composition.

Effect of the Invention

An additive composition for lubricating oils having excellent fluidity in a wide temperature range from low temperature to high temperature can be obtained by using the viscosity modifier for lubricating oils of the present invention. Further, a lubricating oil composition with reduced viscosity in good balance in a wide temperature range from low temperature to high temperature, as compared to conventional one, can be obtained by using the viscosity modifier for lubricating oils of the present invention.

The additive composition for lubricating oils of the present invention has excellent fluidity in a wide temperature range from low temperature to high temperature, as compared to a conventional additive composition for lubricating oils.

Further, the lubricating oil composition of the present invention results in reduction of viscosity in good balance in a wide temperature range from low temperature to high temperature, as compared to a conventional lubricating oil composition.

BRIEF DESCRIPTION OF THE DRAWINGS

FIG. 1 is a plot of MRV of a composition, determined by extrapolation or interpolation from three measurement data, with the proviso that HTHS viscosity is 2.9 mPa·s, versus SSI (shear stability index) determined in the same manner.

FIG. 2 is a plot of kinematic viscosity (KV) at 100° C. of a composition, determined by extrapolation or interpolation from three measurement data, with the proviso that HTHS viscosity is 2.9 mPa·s, versus SSI determined in the same manner.

FIG. 3 is a plot of pour point of a polymer solution having a concentration of 10% by weight in a PAO-4 solvent, as a function of SSI of a composition, determined by extrapolation or interpolation from three measurement data, with the proviso that HTHS viscosity is 2.9 mPa·s.

FIG. 4 is a plot of kinematic viscosity at 100° C. of a polymer solution having a concentration of 10% by weight in a PAO-4 solvent, as a function of SSI of a composition, determined by extrapolation or interpolation from three measurement data, with the proviso that HTHS viscosity is 2.9 mPa·s.

DESCRIPTION OF EMBODIMENTS

Figure 5:
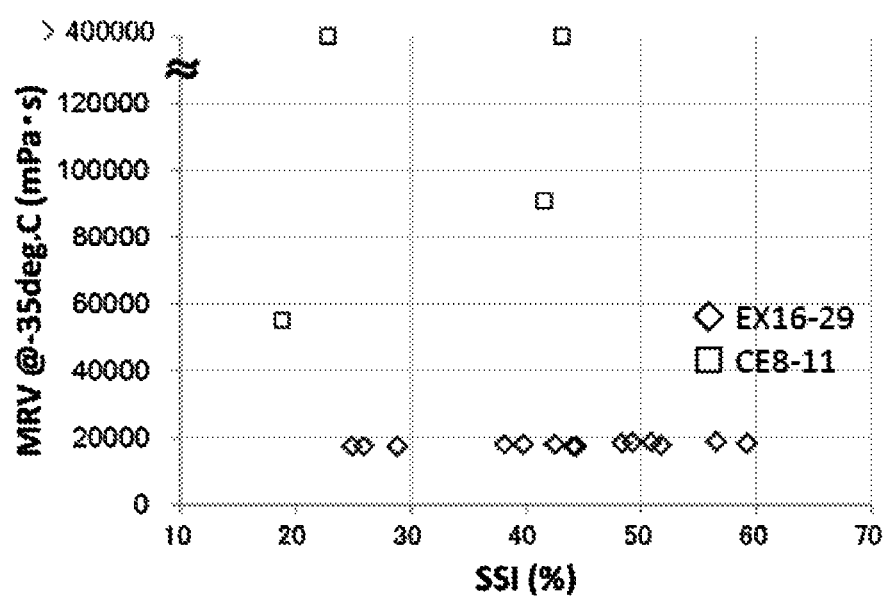
FIG. 5 is a plot of MRV of a composition, determined by extrapolation or interpolation from three measurement data, with the proviso that HTHS viscosity is 2.9 mPa·s, versus SSI determined in the same manner.

In the following, the present invention will be specifically explained.

[Viscosity Modifier for Lubricating Oils]
[Ethylene•α-Olefin Copolymer (A)]
(Monomer Component, Mole Fraction)

The viscosity modifier for lubricating oils of the present invention comprises an ethylene•α-olefin copolymer (A) which comprises ethylene and at least one α-olefin selected from α-olefins having 4 and 5 carbon atoms as structural units.

Said ethylene•α-olefin copolymer (A) generally contains 30 to 50 mole % of structural units derived from at least one α-olefin selected from α-olefins having 4 and 5 carbon atoms and generally contains 50 to 70 mole % of structural units derived from ethylene, with the proviso that the total of all structural units of said copolymer is 100 mole %. The upper limit of the structural unit derived from ethylene is preferably 69 mole %, further preferably 68 mole %, further more preferably 65 mole %, particularly preferably 64 mole %, while the lower limit thereof is preferably 52 mole %, further preferably 55 mole %, particularly preferably 59 mole %. Further, the upper limit of said α-olefin is preferably 48 mole %, further preferably 45 mole %, particularly preferably 41 mole %, while the lower limit thereof is preferably 31 mole %, further preferably 32 mole %, further more preferably 35 mole %, particularly preferably 36 mole %. A content of said α-olefin of less than 30 mole % results in no suitability as a viscosity modifier for lubricating oils since, in particular, fluidity at low temperature is deteriorated and viscosity at low temperature is not reduced. A content of said α-olefin of more than 50 mole % results in no suitability as a viscosity modifier for lubricating oils since shear stability is deteriorated.

The molar ratio between the structural units derived from ethylene and the structural units derived from at least one α-olefin selected from α-olefins having 4 and 5 carbon atoms can fall within the above-mentioned ranges by controlling ratios between raw material monomers.

The lubricating oil additive composition comprising said copolymer (A) has excellent fluidity in a wide temperature range from low temperature to high temperature, as compared to a conventional lubricating oil additive composition. Further, the lubricating oil composition comprising said copolymer (A) results in reduction of viscosity in good balance in a wide temperature range from low temperature to high temperature, as compared to a conventional lubricating oil composition.

The structural unit derived from ethylene in said copolymer (A) can be measured by $^{13}$C-NMR according to a method described in Macromolecule Analysis Handbook, ed. Research Committee of Polymer Analysis, The Japan Society for Analytical Chemistry (Kinokuniya Company Ltd., Jan. 12, 1995).

Examples of said α-olefins having 4 or 5 carbon atoms include 1-butene, 1-pentene, 3-methyl-1-butene, and the like. In particular, 1-butene is preferred in terms of shear stability. The α-olefins may be used singly or in combination of two or more kinds.

As said copolymer (A), ethylene•butene-1 random copolymer, ethylene•pentene-1 random copolymer, ethylene•3-methyl-1-butene random copolymer, ethylene•butene-1•pentene-1 random terpolymer, ethylene•butene-1•3-methyl-1-butene random terpolymer, and ethylene•3-methyl-1-butene•pentene-1 random terpolymer are preferred, ethylene•butene-1 random copolymer, ethylene•pentene-1 random copolymer, and ethylene•3-methyl-1-butene random copolymer are more preferred, and ethylene•butene-1 random copolymer is particularly preferred, in terms of shear stability.

As the conventional viscosity modifier for lubricating oils, a copolymer such as ethylene propylene rubber (EPR) has been used. However, in accordance with the present invention, said ethylene•α-olefin copolymer (A) comprising the structural unit derived from ethylene and the structural unit derived from α-olefins having 4 and/or 5 carbon atoms in specific amounts is used as the viscosity modifier for lubricating oils. The lubricating oil composition comprising said copolymer (A) results in reduction of viscosity in good balance in a wide temperature range from low temperature to high temperature, as compared to a conventional lubricating oil composition. Further, the additive composition for lubricating oils comprising said copolymer (A) has excellent fluidity in a wide temperature range from low temperature to high temperature, as compared to a conventional additive composition for lubricating oils.

The present inventors infer that if side chains derived from a comonomer in said ethylene•α-olefin copolymer are short, the molecular chains of the ethylene•α-olefin copolymer are expanded in a base oil, leading to viscosity increase, and that if the number of the side chains is too small, crystallization occurs or the action of a pour-point depressant is inhibited to result in poor fluidity at low temperature. The present inventors infer that too long side chains or too large number of side chains, on the other hand, result in poor shear stability and unsuitability as the viscosity modifier for lubricating oils. The present inventors infer that the use of said ethylene•α-olefin copolymer comprising α-olefins having 4 and/or 5 carbon atoms in specific amounts rather than propylene or a comonomer having a long side chain, conventionally used as a comonomer, results in reduction of viscosity and in excellence in fluidity, in good balance in a wide temperature range from low temperature to high temperature. Accordingly, it is preferable that the ethylene•α-olefin copolymer of the present invention contains the contents of ethylene and said α-olefins and has a side chain having 2 to 3 carbon atoms.

(Tg)

The glass transition temperature (Tg) of said ethylene•α-olefin copolymer (A), measured by differential scanning calorimetry (DSC), is generally in a range of −75 to −65° C., preferably in a range of −73 to −67° C. The lubricating oil composition comprising said copolymer (A) is preferred because of resulting in reduction of viscosity in good balance in a wide temperature range from low temperature to high temperature, as compared to a conventional lubricating oil composition. Further, the additive composition for lubricating oils comprising said copolymer (A) is preferred because of having excellent fluidity in a wide temperature range from low temperature to high temperature, as compared to a conventional additive composition for lubricating oils. The glass transition temperature (Tg) deviating from said range results in unsuitability as the viscosity modifier for lubricating oils since, in particular, fluidity at low temperature is deteriorated and reduction of viscosity at low temperature cannot be achieved.

The glass transition temperature (Tg) can be controlled, for example, by increasing or decreasing an amount of the ethylene monomer to be fed. The glass transition temperature (Tg), which is controlled by various factors, tends to be increased when the melting point (Tm) as measured by differential scanning calorimetry (DSC) is increased to a certain degree.

In the present invention, the glass transition temperature (Tg) of said copolymer (A) by differential scanning calorimetry (DSC) is measured as follows (a1):

(a1) The following method is conducted using a differential scanning calorimeter (RDC220) manufactured by SEIKO, calibrated with an indium standard.

A sample pan is placed on DSC cell, and the DSC cell is heated from 30° C. (room temperature) to 150° C. at 10° C./min under nitrogen atmosphere, then held at 150° C. for 5 minutes, and thereafter cooled to −100° C. at 10° C./min (cooling process). The intersection point of the tangent line on the inflection point (the point on which an upward convex curve turns into a downward convex curve) of the enthalpy curve obtained in the cooling process is regarded as the glass transition temperature (Tg).

(Tm)

Said ethylene•α-olefin copolymer (A) has a substantially unobserved melting point (Tm) measured by differential scanning calorimetry (DSC) or does not have a melting point (Tm) of −25° C. or more. As used herein, the substantially unobserved melting point refers to a situation in which a heat of fusion ΔH (Tm) (unit: J/g) measured by differential scanning calorimetry (DSC) is not substantially observed. The situation in which the heat of fusion ΔH (Tm) is not substantially observed refers to a situation in which no peak is observed by DSC measurement. Said copolymer (A) that has a substantially unobserved melting point (Tm) or does not have a melting point of −25° C. or more means that it is amorphous at room temperature. The lubricating oil composition comprising said copolymer (A) is preferred because of resulting in reduction of viscosity in good balance in a wide temperature range from low temperature to high temperature, as compared to a conventional lubricating oil composition. Further, the additive composition for lubricating oils comprising said copolymer (A) is preferred because of having excellent fluidity in a wide temperature range from low temperature to high temperature as compared to a conventional additive composition for lubricating oils.

The lubricating oil additive composition comprising the copolymer (A) having a substantially unobserved melting point (Tm) is preferred because of having excellent fluidity at low temperature as compared to a conventional lubricating oil additive composition. The lubricating oil composition comprising the copolymer (A) having a substantially unobserved melting point (Tm) is preferred because of having excellent fluidity at low temperature.

The copolymer (A) having a melting point of −25° C. or more results in unsuitability as the viscosity modifier for lubricating oils since, in particular, fluidity at low temperature is deteriorated and reduction of viscosity at low temperature cannot be achieved.

The melting point (Tm) can be controlled, for example, by increasing or decreasing an amount of the ethylene monomer to be fed. In the present invention, increase in an amount of the ethylene monomer leads to increase in the melting point (Tm), whereas decrease in an amount of the ethylene monomer leads to decrease in the melting point (Tm) or no observation of the melting point (Tm).

The melting point (Tm) of said copolymer (A) by differential scanning calorimetry (DSC) is measured as follows (a2):

(a2) The following method is conducted using a differential scanning calorimeter (RDC220) manufactured by SEIKO Corporation, calibrated with an indium standard.

A sample pan is placed on DSC cell, and the DSC cell is heated from 30° C. (room temperature) to 150° C. at 10° C./min under nitrogen atmosphere. Then, the DSC cell is held at 150° C. for 5 minutes, thereafter cooled to −100° C. at 10° C./min, held at −100° C. for 5 minutes, and thereafter heated to 150° C. at 10° C./min (2nd heating process). The fusion peak top temperature of the enthalpy curve obtained from the 2nd heating process is regarded as a melting point (Tm). If there are two or more fusion peaks, the one having the highest peak is defined as Tm.

($[\eta]$)

The intrinsic viscosity $[\eta]$ of said ethylene·α-olefin copolymer (A), measured in a decalin solvent at 135° C., is generally 1.0 to 2.8 dl/g, preferably 1.0 to 2.5 dl/g, further preferably 1.0 to 2.2 dl/g.

The intrinsic viscosity $[\eta]$ can fall within the abovementioned ranges by controlling polymerization temperature at the time of polymerization, a molecular weight regulator, e.g., hydrogen, or the like.

The lubricating oil composition comprising said copolymer (A) is preferred because of resulting in reduction of viscosity in good balance in a wide temperature range from low temperature to high temperature, as compared to a conventional lubricating oil composition, while having shear stability useful for the viscosity modifier for lubricating oils. Further, the additive composition for lubricating oils comprising said copolymer (A) is preferred because of having excellent fluidity in a wide temperature range from low temperature to high temperature, as compared to a conventional additive composition for lubricating oils, while having shear stability useful for the viscosity modifier for lubricating oils. The intrinsic viscosity deviating from said range results in deterioration of shear stability and in unsuitability of as the viscosity modifier for lubricating oils.

(Density)

The density of said ethylene·α-olefin copolymer (A) is not particularly limited as long as exerting the effects of the present invention. The density is preferably in a range of 858 to 865 kg/m$^3$. The lubricating oil composition comprising said copolymer (A) is preferred because of resulting in reduction of viscosity in good balance in a wide temperature range from low temperature to high temperature, as compared to a conventional lubricating oil composition. Further, the additive composition for lubricating oils comprising said copolymer (A) is preferred because of having excellent fluidity in a wide temperature range from low temperature to high temperature, as compared to a conventional additive composition for lubricating oils.

(Mw, Mw/Mn)

The weight average molecular weight (Mw) of said ethylene·α-olefin copolymer (A) measured by gel permeation chromatography (GPC) is not particularly limited as long as exerting the effects of the present invention. The weight average molecular weight (Mw) is preferably 100,000 to 400,000, more preferably 120,000 to 350,000, still more preferably 140,000 to 350,000, particularly preferably 140,000 to 330,000 in terms of shear stability. The term "weight average molecular weight" as used herein refers to a weight average molecular weight in terms of polystyrene measured by GPC.

The weight average molecular weight (Mw) can fall within the above-mentioned ranges by controlling, for example, polymerization temperature at the time of polymerization, a molecular weight regulator, e.g., hydrogen, or the like.

The lubricating oil composition comprising said copolymer (A) is preferred because of resulting in reduction of viscosity in good balance in a wide temperature range from low temperature to high temperature, as compared to a conventional lubricating oil composition. Further, the additive composition for lubricating oils comprising said copolymer (A) is preferred because of having excellent fluidity in a wide temperature range from low temperature to high temperature, as compared to a conventional additive composition for lubricating oils.

The ratio (molecular weight distribution, Mw/Mn, in terms of polystyrene) of the weight average molecular weight (Mw) to number average molecular weight (Mn) of said copolymer (A) as measured by GPC is not particularly limited as long as exerting the effects of the present invention. The ratio is preferably 4.0 or less, more preferably 3.0 or less, further preferably 2.5 or less. The lower limit of the molecular weight distribution is not particularly limited as long as exerting the effects of the present invention. The lower limit is generally 1.0.

In the present invention, the reason why the lubricating oil composition comprising said ethylene·α-olefin copolymer (A) has excellent viscosity characteristics in a wide temperature range from low temperature to high temperature is unknown. However, the present inventors infer that in a lubricating oil composition at low temperature, said copolymer (A) forms an aggregate in a specific amount of the oil (B) and thereby its flow volume (effective volume) is reduced, and as a result thereof the lubricating oil composition has excellent viscosity characteristics particularly at low temperature. Further, since the aggregate is not precipitated or does not otherwise come out in the lubricating oil composition, the lubricating oil composition also has excellent low-temperature storage property. It is considered that in a lubricating oil composition at high temperature, the ethylene•α-olefin copolymer (A) has, in a specific amount of base oil, high solubility in said base oil, and its aggregate size is small. If the aggregate size is small, a reduction in viscosity due to deformation of the aggregate is also lowered, for example, when the lubricating oil composition comprising said copolymer (A) receives large shear between sliding parts. Therefore, a temporary reduction in viscosity under shearing is lowered. In other words, it is considered that since said copolymer (A) reduces an energy loss while keeping the minimum high temperature high shear (HTHS) viscosity necessary from the viewpoint of abrasion resistance, viscosity can be reduced at parts ranging from a non-sliding part and a low shear region to a high shear region. From such a viewpoint, the present inventors infer that the lubricating oil composition comprising the ethylene•α-olefin copolymer (A) according to the present invention has excellent viscosity characteristics in a wide temperature range from low temperature to high temperature.

Further, the reason why the additive composition for lubricating oils comprising said ethylene•α-olefin copolymer (A) has excellent fluidity in a wide temperature range from a low temperature to a high temperature is unknown. However, the present inventors infer that when a specific amount of said copolymer (A) is used in the additive composition for lubricating oils, since the stretching of molecular chains of said copolymer (A) in a base oil is small as compared to a conventional viscosity modifier, its flow volume (effective volume) is reduced, and thereby the additive composition for lubricating oils has excellent fluidity.

(Method for Producing Ethylene•α-Olefin Copolymer (A))

The ethylene•α-olefin copolymer (A) according to the present invention can be produced by copolymerizing ethylene, an α-olefin, and, if necessary, another monomer in the presence of a known olefin polymerization catalyst. As the known olefin polymerization catalyst, a metallocene-based catalyst, a solid titanium catalyst, a vanadium catalyst, or the like is used. In particular, the metallocene-based catalyst is preferred, in which particularly preferred is a metallocene-based catalyst comprising a metallocene compound of a transition metal selected from e.g., Group 4 of the periodic table, an organoaluminum oxy-compound and/or an ionized ionic compound capable of reacting with the transition metal metallocene compound to form an ion. Particularly preferred in terms of composition distribution is a combination of the transition metal metallocene compound and the ionized ionic compound capable of reacting with the transition metal metallocene compound to form an ion.

Olefin Polymerization Catalyst

In the following, each catalyst will be explained. Further, in the present invention, reference to a catalyst described in Japanese Patent Laid-Open No. 2003-105365 can be made as a catalyst for an olefin copolymer.

(1) Metallocene-Based Catalyst

A known catalyst can be used as a metallocene compound of a transition metal selected from Group 4 of the periodic table that forms a metallocene-based catalyst. The metallocene compound is specifically represented by the following general formula (i):

$$ML_x \quad (i)$$

In the formula (i), M is a transition metal selected from Group 4 of the periodic table, specifically zirconium, titanium, or hafnium, and x is the valence of the transition metal.

L is a ligand coordinating to a transition metal. Of such ligands, at least one ligand L is a ligand having a cyclopentadienyl skeleton. The ligand having a cyclopentadienyl skeleton may have a substituent.

Examples of the ligand having a cyclopentadienyl skeleton include cyclopentadienyl group; indenyl group; 4,5,6,7-tetrahydroindenyl group; fluorenyl group; and the like. These groups may be substituted with hydrocarbon group having the total number of carbon atoms of 1 to 20, or silicon-containing group having the total number of carbon atoms of 1 to 20. In the case where 2 or more are substituted, these substituents may be each identical or different. Further, the hydrocarbon groups having the total number of carbon atoms of 1 to 20 refer to alkyl, alkenyl, alkynyl and aryl groups that are composed of carbon and hydrogen only. Among them, those in which neighboring hydrogen atoms are both substituted to form alicyclic group or aromatic group are included. The hydrocarbon groups having the total number of carbon atoms of 1 to 20 include, in addition to alkyl, alkenyl, alkynyl and aryl groups that are composed of carbon and hydrogen only, heteroatom-containing hydrocarbon groups in which a part of hydrogen atoms directly bonded to these carbon atoms are substituted with halogen atom, oxygen-containing group, nitrogen-containing group, or silicon-containing group, or groups in which neighboring hydrogen atoms form alicyclic group. Specific examples of the hydrocarbon groups having the total number of carbon atoms of 1 to 20 include straight-chain hydrocarbon groups such as methyl group, ethyl group, n-propyl group, allyl group, n-butyl group, n-pentyl group, n-hexyl group, n-heptyl group, n-octyl group, n-nonyl group, n-decanyl group and the like; branched-chain hydrocarbon groups such as isopropyl group, t-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, 1-methyl-1-isopropyl-2-methylpropyl group and the like; cyclic saturated hydrocarbon groups such as cyclopentyl group, cyclohexyl group, cycloheptyl group, cyclooctyl group, norbornyl group, adamantyl group and the like; cyclic unsaturated hydrocarbon groups such as phenyl group, naphthyl group, biphenyl group, phenanthryl group, anthracenyl group and the like, and those in which the aromatic ring is substituted with alkyl groups; saturated hydrocarbon groups that are substituted with aryl-group such as benzyl group, cumyl group and the like; and heteroatom-containing hydrocarbon groups such as methoxy group, ethoxy group, phenoxy group, N-methylamino group, trifluoromethyl group, tribromomethyl group, pentafluoroethyl group, pentafluorophenyl group and the like.

The silicon-containing groups refer, for example, to groups in which the ring-carbon of cyclopentadienyl group is directly bonded with a covalent bond to silicon atom, and specifically to alkylsilyl groups and arylsilyl groups. Examples of the silicon-containing groups having the total number of carbon atoms of 1 to 20 include trimethylsilyl group, triphenylsilyl group and the like.

When the compound represented by the general formula (i) has two or more groups having a cyclopentadienyl skeleton as the ligands L, two groups having a cyclopentadienyl skeleton of them may be bonded to each other through an alkylene group such as ethylene or propylene, a substituted alkylene group such as isopropylidene or diphenylmethylene, di-p-tolylmethylene, bis[4-(dimethylamino) phenyl]methylene, bis(4-methoxy-3-methylphenyl)methylene, a silylene group, a substituted silylene group such as dimethylsilylene, diphenylsilylene, or methylphenylsilylene, or the like.

Examples of L other than the ligand having a cyclopentadienyl skeleton include hydrocarbon groups having 1 to 12 carbon atoms, alkoxy groups, aryloxy groups, halogen atoms, a hydrogen atom, sulfonic acid-containing groups (—$SO_3R^a$) (wherein $R^a$ is an alkyl group, an alkyl group substituted with a halogen atom, an aryl group, or an aryl group substituted with a halogen atom or an alkyl group), and the like.

Examples of the hydrocarbon groups having 1 to 12 carbon atoms include alkyl groups, cycloalkyl groups, aryl groups, aralkyl groups, and the like, and more specifically include alkyl groups such as methyl, ethyl, n-propyl, isopropyl, n-butyl, isobutyl, sec-butyl, t-butyl, pentyl, hexyl, octyl, decyl, and dodecyl; cycloalkyl groups such as cyclopentyl and cyclohexyl; aryl groups such as phenyl and tolyl; and aralkyl groups such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy, octoxy, and the like.

Examples of the aryloxy groups include phenoxy and the like.

Examples of the sulfonic acid-containing groups (—$SO_3R^a$) include methanesulfonato, p-toluenesulfonato, trifluoromethanesulfonato, p-chlorobenzenesulfonato, and the like.

Examples of the halogen atoms include fluorine, chlorine, bromine, and iodine.

Listed below are examples of the metallocene compounds containing at least two ligands having a cyclopentadienyl skeleton:

bis(methylcyclopentadienyl)zirconium dichloride;
bis(ethylcyclopentadienyl)zirconium dichloride;
bis(n-propylcyclopentadienyl)zirconium dichloride;
bis(indenyl)zirconium dichloride;
bis(4,5,6,7-tetrahydroindenyl)zirconium dichloride;
di-p-tolylmethylene(cyclopentadienyl)(octamethyloctahydridodibenzfluorenyl)zirconium dichloride;
[bis[4-(dimethylamino)phenyl]methylene($\eta^5$-cyclopentadienyl)($\eta^5$-octamethyloctahydrodibenzofluorenyl)]hafnium dichloride;
[bis(4-methoxy-3-methylphenyl)methylene($\eta^5$-cyclopentadienyl)($\eta^5$-octamethyloctahydrodibenzofluorenyl)]hafnium dichloride; and the like.

Also mentions can be made of compounds in which a zirconium metal is replaced with a titanium or hafnium metal, or compounds in which a hafnium metal is replaced with a titanium or zirconium metal in such compounds as described above.

In accordance with the present invention, as a metallocene compound, a compound represented by the following general formula (ii) is also employable.

$$L^1M^1X_z \qquad (ii)$$

(wherein M is a metal of Group 4 of the periodic table or a metal of lanthanide series; $L^1$ is a derivative of delocalization it bond group and imparts restraint geometrical shape to a metal $M^1$ active site; X is each independently hydrogen, halogen, a hydrocarbon group containing 20 or less carbon atoms, silicon, or germanium, a silyl group, or a germyl group).

Of the compounds represented by the general formula (ii), preferable are compounds represented by the following general formula (iii).

In the formula, $M^1$ is titanium, zirconium, or hafnium, and X is the same as described above. Cp is π-bonded to $M^1$ and is a substituted cyclopentadienyl group having a substituent Z. Z is oxygen, sulfur, boron, or an element of Group 14 of the periodic table (for example, silicon, germanium, or tin), Y is a ligand containing nitrogen, phosphorus, oxygen, or sulfur, and Z and Y may together form a condensed ring.

Specific examples of the compounds represented the general formula (iii) include [dimethyl(t-butylamide)(tetramethyl-$\eta^5$-cyclopentadienyl)silane]titanium dichloride, [(t-butylamide)(tetramethyl-$\eta^5$-cyclopentadienyl)-1,2-ethanediyl]titanium dichloride, [dibenzyl(t-butylamide)(tetramethyl-$\eta^5$-cyclopentadienyl)silane]titanium dichloride, [dimethyl(t-butylamide)(tetramethyl-$\eta^5$-cyclopentadienyl) silane]dibenzyltitanium, [dimethyl(t-butyl amide)(tetramethyl-$\eta^5$-cyclopentadienyl)silane]dimethyltitanium, [(t-butylamide)(tetramethyl-$\eta^5$-cyclopentadienyl)-1,2-ethanediyl] dibenzyltitanium, [(methylamide)(tetramethyl-$\eta^5$-cyclopentadienyl)-1,2-ethanediyl]dineopentyltitanium, [(phenylphosphide)(tetramethyl-$\eta^5$-cyclopentadienyl)methylene]diphenyltitanium, [dibenzyl(t-butylamide)(tetramethyl-$\eta^5$-cyclopentadienyl)silane]dibenzyltitanium, [dimethyl(benzylamide)($\eta^5$-cyclopentadienyl]silane]di (trimethylsilyl)titanium, [dimethyl(phenylphosphide) (tetramethyl-$\eta^5$-cyclopentadienyl)silane]dibenzyltitanium, [(tetramethyl-$\eta^5$-cyclopentadienyl)-1,2-ethanediyl]dibenzyltitanium, [2-$\eta^5$-(tetramethyl-cyclopentadienyl)-1-methyl-ethanolate(2-)]dibenzyltitanium, [2-$\eta^5$-(tetramethyl-cyclopentadienyl)-1-methyl-ethanolate(2-)] dimethyltitanium, [2-((4a,4b,8a,9,9a-$\eta$)-9H-fluoren-9-yl) cyclohexanolate(2-)]dimethyltitanium, [2-((4a,4b,8a,9,9a-$\eta$)-9H-fluoren-9-yl)cyclohexanolate(2-)]dibenzyltitanium, and the like.

Also mentions can be made of compounds in which a titanium metal is replaced with a zirconium or hafnium metal in such compounds as described above.

These metallocene compounds may be used singly or in combination of two or more kinds.

In accordance with the present invention, a zirconocene compound having zirconium as the central metal atom and at least two ligands having a cyclopentadienyl skeleton and a hafnocene compound having hafnium as the central metal atom and at least two ligands having a cyclopentadienyl skeleton are preferably used as the metallocene compound represented by the general formula (i). Further, the metallocene compound represented by the general formula (ii) or (iii) preferably has titanium as the central metal atom.

Cocatalyst

As an organoaluminum oxy-compound that forms a metallocene-based catalyst, aluminoxane known in the art can be used. The organoaluminum oxy-compound may also be a benzene-insoluble organoaluminum oxy-compound. Specifically, the organoaluminum oxy-compound is represented by the following general formula.

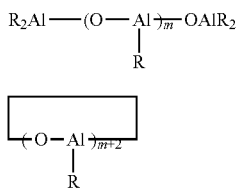

(In the above general formulae (iv) and (v), R is a hydrocarbon group such as methyl, ethyl, propyl, or butyl, preferably methyl or ethyl, particularly preferably methyl, m is an integer of 2 or more, preferably 5 to 40). The aluminoxane may be formed of an alkyloxy aluminum unit mixture including an alkyloxy aluminum unit represented by the formula $(OAl(R^1))$ and an alkyloxy aluminum unit represented by the formula $(OAl(R^2))$ [wherein examples of $R^1$ and $R^2$ may include a hydrocarbon group like R, and $R^1$ and $R^2$ represent groups different from each other].

Examples of ionized ionic compounds that form a metallocene-based catalyst may include Lewis acids, ionic compounds, and the like. Examples of the Lewis acids include compounds represented by $BR_3$ (R is a phenyl group which may have a substituent such as fluorine, methyl, or trifluoromethyl, or fluorine). Examples thereof include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, and the like.

Examples of the ionic compounds may include trialkyl-substituted ammonium salts, N,N-dialkylanilinium salts, dialkylammonium salts, triarylphosphonium salts, and the like. Specific examples of the trialkyl-substituted ammonium salts include triethylammoniumtetra(phenyl)borate, tripropylammoniumtetra(phenyl)borate, tri(n-butyl)ammoniumtetra(phenyl)borate, trimethylammoniumtetra(p-tolyl)borate, trimethylammoniumtetra(o-tolyl)borate, tributylammoniumtetra(pentafluorophenyl)borate, tripropylammoniumtetra(o,p-dimethylphenyl)borate, tributylammoniumtetra(m,m-dimethylphenyl)borate, tributylammoniumtetra(p-trifluoromethylphenyl)borate, tri(n-butyl)ammoniumtetra(o-tolyl)borate, and the like.

Examples of the N,N-dialkylanilinium salts include N,N-dimethylaniliniumtetra(phenyl)borate, N,N-diethylaniliniumtetra(phenyl)borate, N,N-2,4,6-pentamethylaniliniumtetra(phenyl)borate, and the like.

Examples of the dialkylammonium salts include di(1-propyl)ammoniumtetra(pentafluorophenyl)borate, dicyclohexylammoniumtetra(phenyl)borate, and the like.

Examples of the triarylphosphonium salts include triphenylphosphoniumtetra(phenyl)borate, tri(dimethylphenyl)phosphoniumtetra(phenyl)borate, and the like.

Furthermore, examples of the ionic compounds may also include triphenylcarbeniumtetrakis(pentafluorophenyl)borate, N,N-dimethylaniliniumtetrakis(pentafluorophenyl)borate, ferroceniumtetra(pentafluorophenyl)borate, and the like.

In particular, the ionized ionic compounds are preferably used in view of controlling the composition distribution of the ethylene•α-olefin copolymer.

When a metallocene-based catalyst is formed, an organoaluminum compound may also be used together with an organoaluminum oxy-compound and/or an ionized ionic compound. Examples of the organoaluminum compound include compounds represented by the following general formula (vi).

$$R^1{}_n AlX_{3-n} \tag{vi}$$

In the formula, $R^1$ is a hydrocarbon group having 1 to 15, preferably 1 to 4 carbon atoms, X is a halogen atom or a hydrogen atom, and n is 1 to 3.

Examples of the hydrocarbon group having 1 to 15 carbon atoms include an alkyl group, a cycloalkyl group, or an aryl group. Specific examples thereof include methyl, ethyl, n-propyl, isopropyl, isobutyl, pentyl, hexyl, octyl, cyclopentyl, cyclohexyl, phenyl, tolyl, and the like.

Specific examples of the organoaluminum compound include the following compounds:

trialkylaluminium such as trimethylaluminum, triethylaluminium, triisopropylaluminum, triisobutylaluminium, trioctylaluminum, or tri-2-ethylhexylaluminum;

alkenylaluminum such as isoprenylaluminum represented by the general formula: $(i\text{-}C_4H_9)_x Al_y (C_5H_{10})_z$ (wherein x, y, and z are positive numbers, and $z \geq 2x$ is satisfied);

trialkenylaluminum such as triisopropenylaluminum;

dialkylaluminum halides such as dimethylaluminum chloride, diethylaluminum chloride, diisopropylaluminum chloride, diisobutylaluminum chloride, and dimethylaluminum bromide;

alkylaluminum sesquihalides such as methylaluminum sesquichloride, ethylaluminum sesquichloride, isopropylaluminum sesquichloride, butylaluminum sesquichloride, and ethylaluminum sesquibromide;

alkylaluminum dihalides such as methylaluminum dichloride, ethylaluminum dichloride, isopropylaluminum dichloride, and ethylaluminum dibromide;

dialkylaluminum hydrides such as diethylaluminum hydride and dibutylaluminum hydride;

alkylaluminum dihydrides such as ethylaluminum dihydride and propylaluminum dihydride; and the like.

The ethylene•α-olefin copolymer (A) according to the present invention can be obtained by generally copolymerizing monomers (ethylene, α-olefins having 4 and/or 5 carbon atoms, and, if necessary, another monomer) that form a copolymer in a liquid phase in the presence of such a metallocene-based catalyst as described above. In this case, a hydrocarbon solvent is generally used as a polymerization solvent, and an α-olefin such as 1-butene may also be used.

(2) Solid Titanium-Based Catalyst

As the solid titanium catalyst, for example, a solid titanium catalyst component formed by bringing (a) a titanium compound and (b) a magnesium compound represented by the formula: $MgOR^a OR^b$ [$R^a$ and $R^b$ represent an alkyl group or an aryl group, and $R^a$ and $R^b$ may be the same or different] into contact with (c) an electron donor is used without limitation. Examples of such catalysts include those described in [0059] line 6 to [0079] line 9 in Japanese Patent Laid-Open No. 2003-105365.

(3) Vanadium-Based Catalyst

The vanadium catalyst comprises (a) a soluble vanadium compound and (b) an organoaluminum compound.

The soluble vanadium compound (v-1) that forms the vanadium-based catalyst (a) is specifically represented by the following general formula:

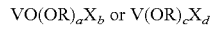

wherein R represents a hydrocarbon group such as an alkyl group, a cycloalkyl group, or an aryl group, X represents a halogen atom, and a, b, c, and d each satisfy $0 \leq a \leq 3$, $0 \leq b \leq 3$, $2 \leq a+b \leq 3$, $0 \leq c \leq 4$, $0 \leq d \leq 4$, and $3 \leq c+d \leq 4$ (a described above preferably satisfies 1<a≤3, c described above preferably satisfies 1<c≤3, and d described above preferably satisfies 0≤d<4).

Specific examples of the soluble vanadium compound represented by the above general formula include:

$VOCl_3$, $VO(OCH_3)Cl_2$, $VO(OC_2H_5)Cl_2$, $VO(OC_2H_5)_{1.5}Cl_{1.5}$, $VO(OC_2H_5)_2Cl$, $VO(O\text{ }n\text{-}C_3H_7)Cl_2$, $VO(O\text{ }iso\text{-}C_3H_7)Cl_2$, $VO(O\text{ }n\text{-}C_4H_9)Cl_2$, $VO(O\text{ }iso\text{-}C_4H_9)Cl_2$, $VO(O\text{ }sec\text{-}C_4H_9)Cl_2$, $VO(O\text{ }t\text{-}C_4H_9)Cl_2$, $VO(OC_2H_5)_3$, $VOBr_2$, $VCl_4$, $VOCl_2$, $VO(O\text{ }n\text{-}C_4H_9)_3$, $VOCl_3 \cdot 2OC_8H_{17}OH$, and the like.

As the organoaluminum compound that forms the vanadium-based catalyst, the organoaluminum compounds exemplified in the metallocene catalyst are used.

Production Method

Said ethylene•α-olefin copolymer (A) is produced by generally copolymerizing ethylene, α-olefins having 4 and/or 5 carbon atoms, and, if necessary, another monomer in a liquid phase in the presence of such a metallocene-based or vanadium-based catalyst as described above. In this case, a hydrocarbon solvent is generally used as a polymerization solvent, and an α-olefin such as 1-butene may also be used.

As the hydrocarbon solvent used in the polymerization of the ethylene•α-olefin copolymer, used are aliphatic hydrocarbons such as pentane, hexane, heptane, octane, decane, dodecane, and kerosene, and halogen derivatives thereof; alicyclic hydrocarbons such as cyclohexane, methyl cyclopentane, and methylcyclohexane, and halogen derivatives thereof; aromatic hydrocarbons such as benzene, toluene, and xylene; halogen derivatives such as chlorobenzene; and the like. These solvents may be used singly or in combination of two or more kinds.

The copolymerization can be conducted by any method of a batch method and a continuous method. The copolymerization by the continuous method is preferable, and the copolymerization by the continuous method using a stirred bed type reactor is particularly preferable.

For conducting the copolymerization by the continuous method, the above metallocene-based catalyst is used, for example, in such a concentration as described below.

The concentration of the metallocene compound in the polymerization system is generally 0.00005 to 0.1 millimole/liter (polymerization volume), preferably 0.0001 to 0.05 millimole/liter. Further, the organoaluminum oxy-compound is supplied in an amount of 1 to 10000, preferably 10 to 5000, by molar ratio of an aluminum atom to a transition metal in the metallocene compound in the polymerization system (Al/transition metal).

The ionized ionic compound is supplied in an amount of 0.5 to 30, preferably 1 to 25, by molar ratio of the ionized ionic compound to the metallocene compound in the polymerization system (ionized ionic compound/metallocene compound).

The organoaluminum compound is used in an amount of generally about 0 to 5 millimoles/liter (polymerization volume), preferably about 0 to 2 millimoles/liter.

In the present invention, the copolymerization reaction is generally performed under the conditions of a temperature of −20° C. to 150° C., preferably 0° C. to 140° C., further preferably 0° C. to 120° C., and a pressure of more than zero (0) and 8 MPa–G (G=gauge pressure) or less, preferably more than zero (0) and 5 MPa–G (G=gauge pressure) or less. It is preferable that the above polymerization conditions are constant in the continuous polymerization method.

As the catalyst, the solid titanium catalyst is used in an amount of generally about 0.001 to 100 millimoles, preferably about 0.005 to 20 millimoles, per liter of polymerization volume in terms of a titanium atom. The organometallic compound catalyst component [II] is used in such an amount that a metal atom in said catalyst component [II] is generally about 1 to 2000 mol, preferably about 2 to 500 mol, with respect to 1 mol of a titanium atom in the solid titanium catalyst component [I] in the polymerization system. The electron donor [III] is used in an amount of generally about 0.001 mol to 10 mol, preferably 0.01 mol to 5 mol, with respect to 1 mol of a metal atom in the organometallic compound catalyst component [II]. The polymerization temperature is generally about 20 to 300° C., preferably about 50 to 150° C., and the polymerization pressure is normal pressure to 10 MPa–G (G=gauge pressure), preferably about 0.2 to 5 MPa–G (G=gauge pressure). In the present invention, polymerization can be conducted by any method of batch, semi-continuous, and continuous methods. Furthermore, the polymerization can also be conducted at two or more divided stages under changed reaction conditions.

When the vanadium-based catalyst is used as the catalyst, the concentration of the soluble vanadium compound in the polymerization system is generally 0.01 to 5 millimoles/liter (polymerization volume), preferably 0.05 to 3 millimoles/liter. It is desirable to supply the soluble vanadium compound at a concentration that is 10 times or less, preferably 1 to 7 times, further preferably 1 to 5 times the concentration of the soluble vanadium compound existing in the polymerization system. Further, the organoaluminum compound is supplied in such an amount that the molar ratio of an aluminum atom to a vanadium atom in the polymerization system (Al/V) is generally 2 or more, preferably 2 to 50, further preferably 3 to 20.

The soluble vanadium compound and the organoaluminum compound is generally diluted with the above-mentioned hydrocarbon solvent and/or liquid propylene and supplied. In this case, it is desirable to dilute said soluble vanadium compound to the above-mentioned concentration, while it is desirable to supply, into the polymerization system, the organoaluminum compound adjusted to an arbitrary concentration that is, for example, 50 times or less the concentration in the polymerization system.

In the case of copolymerization in the presence of the vanadium-based catalyst, the copolymerization reaction is generally performed under the conditions of a temperature of −50° C. to 100° C., preferably −30° C. to 80° C., further preferably −20° C. to 60° C., and a pressure of more than zero (0) and 5 MPa–G (G=gauge pressure) or less, preferably more than zero (0) and 2 MPa–G (G=gauge pressure) or less. It is preferable that the above polymerization conditions are constant in the continuous polymerization method.

Reaction time (mean residence time, in the case of performing copolymerization by a continuous method) is generally 5 minutes to 5 hours, preferably 10 minutes to 3 hours, although varying depending on conditions such as catalyst concentration and polymerization temperature.

Ethylene, α-olefins having 4 and/or 5 carbon atoms, and, if necessary, another monomer in such amounts that the ethylene•α-olefin-based copolymer (A) having specific composition is obtained are supplied to the polymerization system. Furthermore, a molecular weight modifier such as hydrogen can also be used for copolymerization.

Examples of other monomers include propylene and α-olefins having 6 to 10 carbon atoms, specifically, for example, 1-hexene, 3-methyl-1-pentene, 4-methyl-1-pentene, 1-octene, and 1-decene. These monomers are generally 10% by weight or less, preferably 5% by weight or less, more preferably 0% by weight, based on 100% by weight of all monomers that form said ethylene•α-olefin-based copolymer (A).

The ethylene•α-olefin copolymer is generally obtained as a polymerization liquid containing said copolymer by the copolymerization in such a manner as described above. The ethylene•α-olefin copolymer used in the present invention is obtained by treatment of the polymerization liquid by a usual method. The polymerization liquid can also be directly used for preparing a lubricating oil viscosity modifier, as mentioned below.

[Additive Composition for Lubricating Oils]

The additive composition for lubricating oils of the present invention contains the above-mentioned viscosity modifier for lubricating oils and an oil (B), wherein the additive composition for lubricating oils contains the ethylene•α-olefin copolymer (A) and the oil (B) at a weight ratio (A)/(B) of 1/99 to 50/50.

As an ethylene•α-olefin copolymer (A) which is contained in the additive composition for lubricating oils, the ethylene•α-olefin copolymer (A) contained in the above-mentioned viscosity modifier for lubricating oils is used.

The oils (B) contained in the additive composition for lubricating oils include mineral oils; and synthetic oils such as poly-α-olefin, diesters, polyalkylene glycol and the like.

Mineral oils or blends of mineral oils and synthetic oils may be used. The diesters include polyol ester, dioctyl phthalate, dioctyl sebacate and the like.

Mineral oils subjected to a purification step such as dewaxing or the like are generally used, and have several grades depending on purification procedures. Generally, mineral oils having a wax content of 0.5 to 10% are used. One may also use a highly purified oil which is produced, for example, by hydrocracking purification and has a low pour point, a high viscosity index, and a composition mainly composed of isoparaffin. Mineral oils having a kinematic viscosity at 40° C. of 10 to 200 cSt are generally used.

Mineral oils are generally used after a purification step such as dewaxing or the like as described above, have several grades depending on purification procedures, and are classified into several grades which are defined by API (American Petroleum Institute) classification. The properties of lubricating oil bases classified into each of the groups are shown in Table 1.

TABLE 1

| Group | Kind | Viscosity index *1 | Saturated hydrocarbon content (% by volume) *2 | sulfur content (% by weight) *3 |
|---|---|---|---|---|
| (i) | Mineral oil | 80-120 | <90 | >0.03 |
| (ii) | Mineral oil | 80-120 | ≥90 | ≤0.03 |
| (iii) | Mineral oil | ≥120 | ≥90 | ≤0.03 |
| (iv) | poly-α-olefin | | | |
| (v) | lubricating oil base other than the above | | | |

*1: Measured in accordance with ASTM D445 (JIS K2283)
*2: Measured in accordance with ASTM D3238
*3: Measured in accordance with ASTM D4294 (JIS K2541)

Poly-α-olefin in Table 1 is a hydrocarbon-based polymer which is obtained by polymerizing at least an α-olefin having 10 or more carbon atoms as a raw material monomer, and polydecene obtained by polymerizing 1-decene is mentioned as an example.

The oil (B) used in the present invention is preferably an oil belonging to any of groups (i) to (iv). Particularly suitable is a mineral oil having a kinematic viscosity at 100° C. of 1 to 50 mm²/s and a viscosity index of 80 or more, or poly-α-olefin. Furthermore, mineral oils belonging to group (ii) or group (iii) or poly-α-olefin belonging to group (iv) are suitable as the oil (B). Oils belonging to group (ii) or group (iii) tend to have a lower wax content as compared with oils belonging to group (i). Particularly, a suitable oil as the oil (B) is a mineral oil which belongs to group (ii) or group (iii) and has a kinematic viscosity at 100° C. of 1 to 50 mm²/s and a viscosity index of 80 or more, or poly-α-olefin belonging to group (iv).

The additive composition for lubricating oils of the present invention, containing the above-mentioned viscosity modifier for lubricating oils and oil (B), contains the ethylene•α-olefin copolymer (A) and the oil (B) at a weight ratio (A)/(B) of 1/99 to 50/50, preferably 2/98 to 40/60, more preferably 3/97 to 30/70.

Moreover, in addition to the above-mentioned ethylene•α-olefin copolymer (A) and oil (B), the additive composition for lubricating oils of the present invention may contain other components. The other components may optionally include any one or more of the following materials.

One such additive is a detergent. Most conventional detergents used in the field of engine lubrication provide basicity or TBN to the lubricant, due to the presence of basic metal compounds (metal hydroxides, metal oxides, or metal carbonates, typically based on such metals as calcium, magnesium, or sodium). Such metallic overbased detergents, also referred to as overbased or superbased salts, are generally single phase, homogeneous Newtonian systems characterized by a metal content in excess of that which would be present for neutralization according to the stoichiometry of the metal and the particular acidic organic compound reacted with the metal. The overbased materials are typically prepared by reacting an acidic material (typically an inorganic acid or lower carboxylic acid such as carbon dioxide) with a mixture of an acidic organic compound (also referred to as a substrate) and a stoichiometric excess of a metal base, typically in a reaction medium of an inert, organic solvent (e.g., mineral oil, naphtha, toluene, xylene) for the acidic organic substrate. Optionally a small amount of promoter such as a phenol or alcohol is present. The acidic organic substrate will normally have a sufficient number of carbon atoms to provide a degree of solubility in oil.

Such conventional overbased materials and their methods of preparation are well known to those skilled in the art. Patents describing techniques for making basic metallic salts of sulfonic acids, carboxylic acids, phenols, phosphonic acids, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109. Salixarate detergents are described in U.S. Pat. No. 6,200,936 and PCT Publication WO 01/56968. Saligenin detergents are described in U.S. Pat. No. 6,310,009.

Typical amounts of detergents in a crankcase lubricant, which are not particularly limited as long as exerting the effects of the present invention, are generally 1 to 10% by weight, preferably 1.5 to 9.0% by weight, more preferably 2.0 to 8.0% by weight. Moreover, all of said amounts are expressed on an oil-free basis (that is, without the diluent oil in which they are conventionally supplied).

Another additive is a dispersant. Dispersants are well known in the field of lubricants and include primarily what is known as ashless-type dispersants and polymeric dispersants. Ashless type dispersants are characterized by a polar group attached to a relatively high molecular weight hydrocarbon chain. Typical ashless dispersants include nitrogen-containing dispersants such as N-substituted long chain alkenyl succinimides, also known as succinimide dispersants. Succinimide dispersants are more fully described in U.S. Pat. Nos. 4,234,435 and 3,172,892. Another class of ashless dispersant is high molecular weight esters, prepared by reaction of a hydrocarbyl acylating agent and a polyhydric aliphatic alcohol such as glycerol, pentaerythritol, or sorbitol. Such materials are described in more detail in U.S. Pat. No. 3,381,022. Another class of ashless dispersant is Mannich bases. These are materials which are formed by the condensation of a higher molecular weight, alkyl substituted phenol, an alkylene polyamine, and an aldehyde such as formaldehyde and are described in more detail in U.S. Pat. No. 3,634,515. Other dispersants include polymeric dispersant additives, which are generally hydrocarbon-based polymers which contain polar functionality to impart dispersion characteristics to the polymer.

Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403. The amount of dispersant in the present composition, which is not particularly limited as long as exerting the effects of the present invention, can typically be 1 to 10% by weight, preferably 1.5 to 9.0% by weight, more preferably 2.0 to 8.0% by weight, all expressed on an oil-free basis.

Another component is an antioxidant. Antioxidants encompass phenolic antioxidants, which may comprise a butyl substituted phenol containing 2 or 3 t-butyl groups. The para position may also be occupied by a hydrocarbyl group or a group bridging two aromatic rings. The latter antioxidants are described in greater detail in U.S. Pat. No. 6,559,105. Antioxidants also include aromatic amine, such as nonylated diphenylamines. Other antioxidants include sulfurized olefins, titanium compounds, and molybdenum compounds. U.S. Pat. No. 4,285,822, for instance, discloses lubricating oil compositions containing a molybdenum and sulfur containing composition. Typical amounts of antioxidants will, of course, depend on the specific antioxidant and its individual effectiveness, but illustrative total amounts can be 0.01 to 5% by weight, preferably 0.15 to 4.5% by weight, more preferably 0.2 to 4% by weight. Additionally, one or more antioxidants may be present, and certain combinations of these can be synergistic in their combined overall effect.

Viscosity improvers in addition to the polymers of the present technology (also sometimes referred to as viscosity index improvers or viscosity modifiers) may be included in the compositions of this invention. Viscosity improvers are generally polymers, including polyisobutenes, polymethacrylic acid esters, diene polymers, polyalkylstyrenes, esterified styrene-maleic anhydride copolymers, alkenylarene-conjugated diene copolymers and polyolefins. Multifunctional viscosity improvers, which also have dispersant and/or antioxidancy properties are known and may optionally be used.

Another additive is an antiwear agent. Examples of antiwear agents include phosphorus-containing antiwear/extreme pressure agents such as metal thiophosphates, phosphoric acid esters and salts thereof, phosphorus-containing carboxylic acids, esters, ethers, and amides; and phosphites. In certain embodiments, a phosphorus antiwear agent may be present in an amount to deliver generally 0.01 to 0.2% by weight, preferably 0.015 to 0.15% by weight, more preferably 0.02 to 0.1% by weight, further preferably 0.025 to 0.08% by weight of phosphorus, which is not particularly limited as long as exerting the effects of the present invention.

Often the antiwear agent is a zinc dialkyldithiophosphate (ZDP). For a typical ZDP, which may contain 11% by weight of P (calculated on an oil free basis), suitable amounts may include 0.09 to 0.82% by weight. Non-phosphorus-containing anti-wear agents include borate esters (including borated epoxides), dithiocarbamate compounds, molybdenum-containing compounds, and sulfurized olefins.

Other additives that may optionally be used in lubricating oils include pour point depressing agents, extreme pressure agents, anti-wear agents, friction modifiers, color stabilizers, and anti-foam agents, each of which may be used in their conventional amounts.

It is preferable that the additive composition for lubricating oils of the present invention contains the ethylene•α-olefin copolymer (A) and oil (B) in the above-mentioned ranges. When a lubricating oil composition is produced using the additive composition for lubricating oils which contains the ethylene•α-olefin copolymer (A) and oil (B) in the above-mentioned range, mixing the additive composition for lubricating oils and other components of the lubricating oil composition can provide a lubricating oil composition having excellent low-temperature properties with a reduced amount of ethylene•α-olefin copolymer (A).

Moreover, since the additive composition for lubricating oils of the present invention contains the oil (B), it provides good workability at the time of production of a lubricating oil composition and can be readily mixed with the other components of the lubricating oil composition.

The additive composition for lubricating oils of the present invention can be prepared by mixing the ethylene•α-olefin copolymer (A) and the oil (B), as well as, optionally, any other desired components using publicly known conventional methods. Optionally, the ethylene•α-olefin copolymer (A) may be provided as a concentrate in oil, for ease in handling.

(Lubricating Oil Composition)

The lubricating oil composition of the present invention contains said viscosity modifier for lubricating oils containing the above-mentioned ethylene•α-olefin copolymer (A) and contains a lubricating oil base (BB), and may further contain a pour-point depressant (C).

First, each component composing the lubricating oil composition of the present invention is explained.

As ethylene•α-olefin copolymer (A) contained in the lubricating oil composition, the above-mentioned ethylene•α-olefin copolymer (A) contained in a viscosity modifier for lubricating oils is used.

The lubricating oil bases (BB) contained in the lubricating oil composition include mineral oils and synthetic oils such as poly-α-olefin, diesters, polyalkylene glycol and the like.

Mineral oils or blends of mineral oils and synthetic oils may be used. The diesters include polyol ester, dioctyl phthalate, dioctyl sebacate and the like.

Mineral oils subjected to a purification step such as dewaxing or the like are generally used, and have several grades depending on purification procedures. Generally, mineral oils having a wax content of 0.5 to 10% by weight are used. One may also use a highly purified oil which is produced, for example, by hydrocracking purification and has a low pour point, a high viscosity index, and a composition mainly composed of isoparaffin. Mineral oils having a kinematic viscosity at 40° C. of 10 to 200 cSt are generally used.

Mineral oils are generally used after a purification step such as dewaxing or the like as described above, have several grades depending on purification procedures, and are classified into several grades which are defined by API (American Petroleum Institute) classification. The properties of lubricating oil bases classified into each of the groups are shown in the above-mentioned Table 1.

Poly-α-olefin in Table 1 is a hydrocarbon-based polymer which is obtained by polymerizing at least an α-olefin having 10 or more carbon atoms as a raw material monomer, and polydecene obtained by polymerizing 1-decene is mentioned as an example.

The lubricating oil base (BB) used in the present invention may be an oil belonging to any of groups (i) to (iv). In one embodiment, the oil is a mineral oil having a kinematic viscosity at 100° C. of 1 to 50 mm$^2$/s and a viscosity index of 80 or more, or poly-α-olefin. Furthermore, mineral oils belonging to group (ii) or group (iii) or poly-α-olefin belonging to group (iv) are suitable as the lubricating oil base (BB). Oils belonging to group (ii) or group (iii) tend to have a lower wax content as compared with oils belonging to group (i).

Particularly, a suitable oil as the lubricating oil base (BB) is a mineral oil which belongs to group (ii) or group (iii) and has a kinematic viscosity at 100° C. of 1 to 50 mm$^2$/s and a viscosity index of 80 or more, or poly-α-olefin belonging to group (iv).

The pour-point depressants (C) which may be contained in the lubricating oil composition include an alkylated naphthalene, a (co)polymer of alkyl methacrylate, a (co)polymer of alkyl acrylate, a copolymer of alkyl fumarate and vinyl acetate, an α-olefin polymer, a copolymer of an α-olefin and styrene, and the like. In particular, a (co)polymer of alkyl methacrylate and a (co)polymer of alkyl acrylate may be used.

As described above, the lubricating oil composition of the present invention contains said viscosity modifier for lubricating oils containing the ethylene•α-olefin copolymer (A) and contains the lubricating oil base (BB), and may further contain the pour-point depressant (C).

In 100% by weight of the lubricating oil composition, the above-mentioned ethylene•α-olefin copolymer (A) is generally contained in an amount of 0.1 to 5% by weight, preferably in an amount of 0.2 to 4% by weight, more preferably in an amount of 0.4 to 3% by weight, further preferably in an amount of 0.6 to 2% by weight. Furthermore, when the lubricating oil composition of the present invention contains the pour-point depressant (C), in 100% by weight of the lubricating oil composition, the pour-point depressant (C) is generally contained in an amount of 0.05 to 5% by weight, preferably in an amount of 0.05 to 3% by weight, more preferably in an amount of 0.05 to 2% by weight, further preferably in an amount of 0.05 to 1% by weight, which is not particularly limited as long as exerting the effects of the present invention.

The components of the lubricating oil composition of the present invention other than the above-mentioned viscosity modifier for lubricating oils and pour-point depressant (C) are the above-mentioned lubricating oil base (BB) and blending components which are described later.

When the lubricating oil composition of the present invention contains the blending components, there are no particular limitations on the amounts of the blending components, but the amount of the blending components is generally over 0% by weight, preferably 1% by weight or more, more preferably 3% by weight or more, further preferably 5% by weight or more with the proviso that the total of the above-mentioned lubricating oil base (BB) and the blending components is 100% by weight. Furthermore, the amount of the blending components is generally 40% by weight or less, preferably 30% by weight or less, more preferably 20% by weight or less, further preferably 15% by weight or less.

When the amount of the ethylene•α-olefin copolymer (A) in the lubricating oil composition of the present invention is within the above-mentioned range, the lubricating oil composition is particularly useful because it has excellent low-temperature storage properties, low-temperature viscosity and fuel efficiency at high temperatures.

For the lubricating oil composition of the present invention, the temperature dependence of viscosity is small, and elevation of pour point is reduced by the interaction between the above-mentioned ethylene•α-olefin copolymer (A) and the pour-point depressant (C). This lubricating oil composition is excellent in low-temperature properties at any shear rate, and shows excellent handleability at a low temperature and lubricating performance.

In addition to the above-mentioned ethylene•α-olefin copolymer (A), lubricating oil base (BB) and pour-point depressant (C), the lubricating oil composition of the present invention may contain blending components. The blending components include additives having an effect of improving viscosity index such as (co)polymer of alkyl methacrylate, hydrogenated SBR (styrene butadiene rubber), SEBS (styrene-ethylene butylene-styrene block copolymer) and the like, detergents, rust preventives, dispersants, extreme-pressure additives, antifoaming agents, antioxidants, metal deactivators and the like, as described in greater detail above.

The lubricating oil composition of the present invention can be prepared by mixing or dissolving the above-mentioned ethylene•α-olefin copolymer (A), lubricating oil base (BB), pour-point depressant (C), and, if necessary, the other blending components using publicly known conventional methods.

The lubricating oil composition of the present invention has excellent low-temperature storage properties, low-temperature viscosity and fuel efficiency at high temperatures. Therefore, the lubricating oil composition of the present invention can be used for lubrication of any of a variety of known mechanical devices, e.g., as engine oils for automobiles, lubricants for heavy duty diesel engines, lubricants for marine diesel engines, lubricants for two-cycle engines, lubricants for automatic transmissions and manual transmissions, gear lubricants, and greases.

EXAMPLES

The present invention will be further described in detail with reference to the examples, but it should be construed that the present invention is in no way limited to those examples.

[Density]

The densities of the copolymers produced or used in the Examples or Comparative Examples are measured according to the method described in ASTM D1505.

[DSC Measurement]

For a copolymer produced in Examples or Comparative Examples, DSC measurement is conducted using a Differential Scanning calorimeter (RDC220) (SEIKO) which is calibrated with an indium standard.

About 10 mg of the above-mentioned sample for the measurement is weighed on an aluminum DSC pan. A cover is crimped to the pan, and the sample is left in a closed atmosphere, and thereby a sample pan is obtained.

The sample pan is placed on DSC cell, and an empty aluminum pan is placed as a reference. The DSC cell is heated from 30° C. (room temperature) to 150° C. at 10° C./min under nitrogen atmosphere (1st heating process).

In the second place, the DSC cell is held at 150° C. for 5 minutes, cooled at 10° C./min, and cooled to −100° C. (cooling process). The DSC cell is held at −100° C. for 5 minutes, and heated to 150° C. at 10° C./min (2nd heating process).

The intersection point of the tangent line on the inflection point (the point on which an upward convex curve turns into a downward convex curve) of the enthalpy curve obtained in the cooling process is regarded as a glass transition temperature (Tg).

The fusion peak top temperature of the enthalpy curve obtained from the 2nd heating process is regarded as a melting point (Tm). If there are two or more fusion peaks, the one having the highest peak is defined as Tm.

[Weight Average Molecular Weight and Molecular Weight Distribution]

The weight average molecular weights and molecular weight distributions of the copolymers produced or used in the Examples or Comparative Examples are measured by the following methods.

(Pretreatment of Sample)

30 mg of the copolymer produced or used in the Examples or Comparative Examples is dissolved in 20 ml of o-dichlorobenzene at 145° C., and the solution is filtered by a sintered filter having pore size of 1.0 μm, and thereby a sample for the analysis is obtained.

(GPC Analysis)

The weight average molecular weight (Mw), a number average molecular weight (Mn), and a molecular weight distribution curve are determined using gel permeation chromatography (GPC). The calculation is conducted in terms of polystyrene. Mw/Mn is calculated from the determined weight average molecular weight (Mw) and number average molecular weight (Mn).

(Measurement Apparatus)

Gel permeation chromatograph Alliance GPC 2000 (Waters)

(Analysis Apparatus)

Data processing software Empower 2 (registered trademark, Waters)

(Measurement Conditions)

Columns: two TSK gel $GMH_6$-HT columns and two TSK gel $GMH_6$-HTL columns (each column has diameter 7.5 mm x length 30 cm, TOSOH CORPORATION)

Column temperature: 140° C.

Moving phase: o-dichlorobenzene (containing 0.025% BHT)

Detector: differential refractometer

Flow rate: 1 mL/min

Sample concentration: 0.15% (w/v)

Injected amount: 500 μL

Sampling time interval: 1 second

Column calibration: monodisperse polystyrene (TOSO CORPORATION)

Molecular weight conversion: PS conversion/standard conversion method

[Structural Unit Derived from Ethylene]

The structural units (mole %) derived from ethylene and α-olefin of the copolymer produced or used in Examples or Comparative Examples are determined by analysis of $^{13}C$-NMR spectrum.

(Measurement Apparatus)

LA 500 Model nuclear magnetic resonance device (JEOL Ltd.)

(Measurement Conditions)

The measurement is conducted in a mixed solvent of orthodichlorobenzene and benzene-d6 (volume ratio: orthodichlorobenzene/benzene-d6=3/1 to 4/1) under the conditions of a temperature of 120° C., a pulse width of 45° pulse, and a pulse repetition time of 5.5 seconds.

[Intrinsic Viscosity [η] (dL/g)]

The intrinsic viscosity [η] was measured at 135° C. using a decalin solvent. Specifically, about 20 mg of polymerization powder, pellet, or resin lump was dissolved in 15 ml of decalin, and specific viscosity ηsp was measured in an oil bath at 135° C. To the decalin solution, 5 ml of a decalin solvent was added, the solution was diluted, and the specific viscosity ηsp was then measured in the same manner. This dilution procedure was further repeated twice, and a value of ηsp/C in a case in which the concentration (C) was extrapolated to zero (0) was determined as the intrinsic viscosity (see the following expression).

$$[\eta]=\lim (\eta sp/C) \ (C \to 0)$$

[High Temperature High Shear (HTHS) Viscosity]

The HTHS viscosities (150° C.) of the lubricating oil compositions prepared in the Examples or Comparative Examples are measured at 150° C. and $10^6 s^{-1}$ based on ASTM D4624.

For the purpose of protecting an engine, the lower limit of HTHS viscosity is specified according to SAE viscosity classification. Accordingly, for discussing the superiority and inferiority of the fuel efficiency of lubricating oil compositions, it is rational to form formulations as lubricating oil compositions so that HTHS viscosities are similar and to compare various viscosity characteristics of the lubricating oil compositions.

[Shear Stability Index (SSI)]

The SSIs of the lubricating oil compositions prepared in the Examples or Comparative Examples are measured based on ASTM D 6278. The SSI is a scale of reduction of the kinematic viscosity owing to breakage of molecular chains which is caused when the copolymer components in the lubricating oil suffer shearing force in sliding. Larger SSI values show greater reduction of the kinematic viscosity.

In general, a lubricating oil composition having a low SSI exhibits a tendency that reduction in kinematic viscosity is relatively lower while the ratio of a viscosity modifier in a formulation is relatively higher. In contrast, a lubricating oil composition having a high SSI exhibits a tendency that reduction in kinematic viscosity is relatively higher while the ratio of a viscosity modifier in a formulation is relatively lower.

Since the amount of a viscosity modifier used for obtaining a lubricating oil composition has a large influence on the production cost of the lubricating oil composition, lubricating oil compositions having different SSIs are generally produced and sold depending on a level required for reduction in kinematic viscosity.

Accordingly, for discussing the superiority and inferiority of the fuel efficiency of lubricating oil compositions, it is rational to compare the lubricating oil compositions having similar SSIs.

[Pour Point of Polymer Solution of 10% by Weight of PAO-4 Solution (Pour Point (° C.))]

The copolymer produced or used in Examples or Comparative Examples was dissolved at 130° C. in a solvent PAO-4 (hydrogenated decene oligomer product having a kinematic viscosity of around 4 mm²/s at 100° C.) so that the concentration of the copolymer was 10% by weight. The pour point of the obtained solution was measured based on ASTM D6749.

When formulations are formed as lubricating oil compositions to have similar HTHS viscosities and lubricating oil additive compositions used in the lubricating oil compositions having similar SSIs are compared, the lower the pour point of said lubricating oil additive composition, the more excellent the low-temperature fluidity exhibited by said lubricating oil additive composition.

[Pour Point of Polymer Solution of 10% by Weight of PAO-4 Solution (Kinematic Vis. (mm²/s))]

The copolymer produced or used in Examples or Comparative Examples was dissolved at 130° C. in a solvent PAO-4 (hydrogenated decene oligomer product having a kinematic viscosity of around 4 mm²/s at 100° C.) so that the concentration of the copolymer was 10% by weight. The pour point of the obtained solution was measured based on ASTM D446.

When formulations are formed as lubricating oil compositions to have similar HTHS viscosities and lubricating oil additive compositions used in the lubricating oil compositions having similar SSIs are compared, the lower the kinematic viscosity of said lubricating oil additive composition, the more excellent the high-temperature fluidity exhibited by said lubricating oil additive composition.

[Kinematic Viscosity (KV)]

The kinematic viscosities at 100° C. of the lubricating oil compositions prepared in the Examples or Comparative Examples are measured based on ASTM D446.

When formulations are formed as lubricating oil compositions to have similar HTHS viscosities and the lubricating oil compositions having similar SSIs are compared, the lower the kinematic viscosity of said lubricating oil composition, the more excellent the high-temperature fuel efficiency of said lubricating oil additive composition.

[Cold Cranking Simulator (CCS) Viscosity]

The CCS viscosities (−30° C.) of the lubricating oil compositions prepared in the Examples or Comparative Examples are measured based on ASTM D 2602. The CCS viscosity is used in evaluating the sliding properties (starting properties) at a crank shaft at a low temperature. Smaller values show better low-temperature viscosity (low-temperature properties) of the lubricating oil.

When formulations are formed as lubricating oil compositions to have similar HTHS viscosities and the lubricating oil compositions having similar SSIs are compared, the lower the CCS viscosity of said lubricating oil composition, the more excellent the low-temperature fuel efficiency (low-temperature startability) of said lubricating oil composition.

[Mini-Rotary (MR) Viscosity (MRV), Yield Stress (Pa)]

The MR viscosities (−35° C.) and yield stresses of the lubricating oil compositions prepared in the Examples or Comparative Examples are measured based on ASTM D 3829 and D 4648.

When formulations are formed as lubricating oil compositions to have similar HTHS viscosities and the lubricating oil compositions having similar SSIs are compared, the lower the MR viscosity and yield stress of said lubricating oil composition, the more excellent the low-temperature oil pumping property of said lubricating oil composition.

[Low Temperature Storage Stability Test, Evaluation of Insolubles]

The low-temperature storage properties of viscosity modifiers for lubricating oils are evaluated by incorporating the viscosity modifiers for lubricating oils into a synthetic engine oil formulation which has previously been found to promote gelation with copolymers which are marginally soluble. The synthetic engine oil formulation used is as follows:

| | |
|---|---|
| API Group IV Oil (PAO) | 81.1 (% by weight) |
| Additive* | 17.3 (% by weight) |
| Pour Point Depressant (polymethacrylate) | 0.2 (% by weight) |
| Copolymer to be evaluated | 1.4 (% by weight) |
| Total | 100 (% by weight) |

*Additive = a conventional engine lubricant package including 14.2 parts of a commercial package (including overbased Ca detergents, N-containing dispersants, antioxidants, antiwear agent, friction modifier, zinc dialkyldithiophosphate, and antifoam agent) + 3.1 parts of a detergent booster.

The test involves subjecting the engine oil to a four-week cold storage cycle with temperatures alternating from −18 to 0° C. This temperature cycling has been found to promote rapid nucleation and growth of crystals that exacerbate the gelation process.

All the viscosity modifiers for lubricating oils in Examples and Comparative Examples (identified in greater detail below) are evaluated using this method. The engine oil is observed at the end of each week during the four-week cycle and the results for each week are indicated with the designation AA or BB.

AA . . . (no gelation and/or no insolubles)
BB . . . (gelation and/or insolubles)

These results are summarized in Tables 3-1 and 3-2 for each of the viscosity modifiers for lubricating oils. The worst results for any of the four weeks in the test are shown.

Example 1

To one of the feed openings of a 2 L volume pressurized continuous polymerization reactor equipped with a stirring blade and thoroughly purged with nitrogen, hexane solutions prepared with methylaluminoxane (MMAO-3A: TOSOH FINECHEM CORPORATION) at a concentration of 12.5 mmol/L, di-p-tolylmethylene(cyclopentadienyl)(octamethyloctahydridodibenzfluorenyl)zirconium dichloride at a concentration of 0.025 mmol/L and triisobutylaluminum (TiBA: TOSOH FINECHEM CORPORATION) at a concentration of 20.0 mmol/L are continuously introduced at flow rates of 0.014 L/hr, 0.014 L/hr and 0.045 L/hr, respectively. At the same time, to another feed opening of the continuous polymerization reactor, ethylene at a flow rate of 137.5 g/hr, butene-1 at a flow rate of 1380 g/hr, and hydrogen at a flow rate of 0.15 NL/hr are continuously provided. Purified and dehydrated n-hexane is continuously introduced at a total flow rate of 0.95 L/hr through the above two feed openings and an opening at the top of the polymerization reactor, and continuous solution polymerization is conducted under conditions wherein the polymerization temperature is 90° C., the total pressure is 3.6 MPa–G (G=gauge pressure), and the stirring rotation frequency is 700 rpm. Coolants are circulated through jackets equipped outside of the polymerization reactor, and thereby polymerization heat is removed.

The hexane solution comprising an ethylene/butene-1 copolymer which is produced by performing polymerization under the above-mentioned conditions is continuously withdrawn at a rate of 0.25 kg/hr in terms of the ethylene/butene-1 copolymer through an outlet equipped at the top of the polymerization reactor such that the pressure is maintained at 3.6 MPa–G. The resultant polymerization solution is poured into a large amount of methanol so as to precipitate the ethylene/butene-1 copolymer. Then, the ethylene/butene-1 copolymer is dried under reduced pressure at 130° C. for 1 hour. The properties of the resulting polymer are shown in Table 2-1.

Example 2

To one of the feed openings of a 2 L volume pressurized continuous polymerization reactor equipped with a stirring blade and thoroughly purged with nitrogen, hexane solutions prepared by mixing methylaluminoxane (MMAO-3A: TOSOH FINECHEM CORPORATION) at a concentration of 12.5 mmol/L, di-p-tolylmethylene(cyclopentadienyl)(octamethyloctahydridodibenzfluorenyl)zirconium dichloride at a concentration of 0.025 mmol/L and triisobutylaluminum (TiBA: TOSOH FINECHEM CORPORATION) at a concentration of 20.0 mmol/L are continuously introduced at flow rates of 0.014 L/hr, 0.014 L/hr and 0.045 L/hr, respectively. At the same time, to another feed opening of the continuous polymerization reactor, ethylene at a flow rate of 137.5 g/hr, butene-1 at a flow rate of 1380 g/hr, and hydrogen at a flow rate of 0.15 NL/hr are continuously provided. Purified and dehydrated n-hexane is continuously introduced at a total flow rate of 0.95 L/hr through the above two feed openings and an opening at the top of the polymerization reactor, and continuous solution polymerization is conducted under conditions wherein the polymerization temperature is 90° C., the total pressure is 3.6 MPa–G (G=gauge pressure), and the stirring rotation frequency is 700 rpm. Coolants are circulated through jackets equipped outside of the polymerization reactor, and thereby polymerization heat is removed.

The hexane solution comprising an ethylene/butene-1 copolymer which is produced by performing polymerization under the above-mentioned conditions is continuously withdrawn at a rate of 0.20 kg/hr in terms of the ethylene/butene-1 copolymer through an outlet equipped at the top of the polymerization reactor such that the pressure is maintained at 3.6 MPa–G. The resultant polymerization solution is poured into a large amount of methanol so as to precipitate the ethylene/butene-1 copolymer. Then, the ethylene/butene-1 copolymer is dried under reduced pressure at 130° C. for 1 hour. The properties of the resulting polymer are shown in Table 2-1.

Example 3

To one of the feed openings of a 2 L volume pressurized continuous polymerization reactor equipped with a stirring blade and thoroughly purged with nitrogen, a hexane solution prepared by mixing methylaluminoxane (MMAO-3A: TOSOH FINECHEM CORPORATION) at a concentration of 12.5 mmol/L and di-p-tolylmethylene(cyclopentadienyl)(octamethyloctahydridodibenzfluorenyl)zirconium dichloride at a concentration of 0.025 mmol/L and a hexane solution prepared with triisobutylaluminum (TiBA: TOSOH FINECHEM CORPORATION) at a concentration of 20.0 mmol/L are continuously introduced at flow rates of 0.020 L/hr and 0.045 L/hr, respectively. At the same time, to another feed opening of the continuous polymerization reactor, ethylene at a flow rate of 125 g/hr, butene-1 at a flow rate of 1200 g/hr, and hydrogen at a flow rate of 1.0 NL/hr are continuously provided. Purified and dehydrated n-hexane is continuously introduced at a total flow rate of 1.50 L/hr through the above two feed openings and an opening at the top of the polymerization reactor, and continuous solution polymerization is conducted under conditions wherein the polymerization temperature is 110° C., the total pressure is 4.0 MPa–G (G=gauge pressure), and the stirring rotation frequency is 500 rpm. Coolants are circulated through jackets equipped outside of the polymerization reactor, and thereby polymerization heat is removed.

The hexane solution comprising an ethylene/butene-1 copolymer which is produced by performing polymerization under the above-mentioned conditions is continuously withdrawn at a rate of 0.19 kg/hr in terms of the ethylene/butene-1 copolymer through an outlet equipped at the top of the polymerization reactor such that the pressure is maintained at 4.0 MPa–G. The resultant polymerization solution is poured into a large amount of methanol so as to precipitate the ethylene/butene-1 copolymer. Then, the ethylene/butene-1 copolymer is dried under reduced pressure at 130° C. for 1 hour. The properties of the resulting polymer are shown in Table 2-1.

Example 4

To one of the feed openings of a 310 L volume pressurized continuous polymerization reactor equipped with a stirring blade and thoroughly purged with nitrogen, purified and dehydrated n-hexane is continuously introduced at a flow rate of 8.0 L/hr, and hexane solutions prepared with methylaluminoxane (MMAO-3A: TOSOH FINECHEM CORPORATION) at a concentration of 5.0 mmol/L, [dimethyl(t-butylamide)(tetramethyl-$\eta^5$-cyclopentadienyl)silane] titanium dichloride at a concentration of 0.3 mmol/L and triphenylcarbeniumtetrakis(pentafluorophenyl)borate at a concentration of 0.1 mmol/L are continuously introduced at flow rates of 1.6 L/hr, 0.4 L/hr and 1.32 L/hr (Total: 3.32 L/hr). At the same time, to another feed opening of the continuous polymerization reactor, ethylene at a flow rate of 4.8 kg/hr and butene-1 at a flow rate of 17.3 kg/hr are continuously provided. Then, continuous solution polymerization is conducted under conditions wherein the polymerization temperature is 115° C., the total pressure is 2.2 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.3 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 5

To one of the feed openings of a 310 L volume pressurized continuous polymerization reactor equipped with a stirring blade and thoroughly purged with nitrogen, purified and dehydrated n-hexane is continuously introduced at a flow rate of 8.0 L/hr, and hexane solutions prepared with methylaluminoxane (MMAO-3A: TOSOH FINECHEM CORPORATION) at a concentration of 5.0 mmol/L, [dimethyl(t-butylamide)(tetramethyl-$\eta^5$-cyclopentadienyl)silane]

titanium dichloride at a concentration of 0.3 mmol/L and triphenylcarbeniumtetrakis(pentafluorophenyl)borate at a concentration of 0.1 mmol/L are continuously introduced at flow rates of 1.6 L/hr, 0.3 L/hr and 1.32 L/hr (Total: 3.22 L/hr). At the same time, to another feed opening of the continuous polymerization reactor, ethylene at a flow rate of 4.7 kg/hr and butene-1 at a flow rate of 18.5 kg/hr are continuously provided. Then, continuous solution polymerization is conducted under conditions wherein the polymerization temperature is 115° C., the total pressure is 2.2 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 6.3 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 6

To one of the feed openings of a 310 L volume pressurized continuous polymerization reactor equipped with a stirring blade and thoroughly purged with nitrogen, purified and dehydrated n-hexane is continuously introduced at a flow rate of 19.2 L/hr, and hexane solutions prepared with tri-isobutylaluminum (TiBA: TOSOH FINECHEM CORPORATION) at a concentration of 5 mmol/L, [bis[4-(dimethylamino)phenyl]methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.11 L/hr and 1.1 L/hr (Total: 2.01 L/hr). At the same time, to another feed opening of the continuous polymerization reactor, ethylene at a flow rate of 6.2 kg/hr, butene-1 at a flow rate of 12.0 kg/hr and hydrogen at a flow rate of 54 NL/hr are continuously provided. Then, continuous solution polymerization is conducted under conditions wherein the polymerization temperature is 115° C., the total pressure is 3.2 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.6 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 7

To one of the feed openings of a 310 L volume pressurized continuous polymerization reactor equipped with a stirring blade and thoroughly purged with nitrogen, purified and dehydrated n-hexane is continuously introduced at a flow rate of 20.1 L/hr, and hexane solutions prepared with tri-isobutylaluminum (TiBA: TOSOH FINECHEM CORPORATION) at a concentration of 5 mmol/L, [bis[4-(dimethylamino)phenyl]methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.06 L/hr and 0.6 L/hr (Total: 1.46 L/hr). At the same time, to another feed opening of the continuous polymerization reactor, ethylene at a flow rate of 5.4 kg/hr, butene-1 at a flow rate of 13.4 kg/hr and hydrogen at a flow rate of 88 NL/hr are continuously provided. Then, continuous solution polymerization is conducted under conditions wherein the polymerization temperature is 105° C., the total pressure is 2.8 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 5.7 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 8

To one of the feed openings of a 310 L volume pressurized continuous polymerization reactor equipped with a stirring blade and thoroughly purged with nitrogen, purified and dehydrated n-hexane is continuously introduced at a flow rate of 21.7 L/hr, and hexane solutions prepared by mixing triisobutylaluminum (TiBA: TOSOH FINECHEM CORPORATION) at a concentration of 5 mmol/L, [bis[4-(dimethylamino)phenyl]methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.09 L/hr and 0.9 L/hr (Total: 1.79 L/hr). At the same time, to another feed opening of the continuous polymerization reactor, ethylene at a flow rate of 6.0 kg/hr, butene-1 at a flow rate of 15.0 kg/hr and hydrogen at a flow rate of 70 NL/hr are continuously provided. Then, continuous solution polymerization is conducted under conditions wherein the polymerization temperature is 105° C., the total pressure is 2.6 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 8.0 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 9

To one of the feed openings of a 310 L volume pressurized continuous polymerization reactor equipped with a stirring blade and thoroughly purged with nitrogen, purified and dehydrated n-hexane is continuously introduced at a flow rate of 18.7 L/hr, and hexane solutions prepared by mixing triisobutylaluminum (TiBA: TOSOH FINECHEM CORPORATION) at a concentration of 5 mmol/L, [bis[4-(dimethylamino)phenyl]methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.07 L/hr and 0.7 L/hr (Total: 1.57 L/hr). At the same time, to another feed opening of the continuous polymerization reactor, ethylene at a flow rate of 6.0 kg/hr, butene-1 at a flow rate of 14.0 kg/hr and hydrogen at a flow rate of 66 NL/hr are continuously provided. Then, continuous solution polymerization is conducted under conditions wherein the polymerization temperature is 95° C., the total pressure is 2.2 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.9 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 10

To one of the feed openings of a 310 L volume pressurized continuous polymerization reactor equipped with a stirring blade and thoroughly purged with nitrogen, purified and dehydrated n-hexane is continuously introduced at a flow rate of 20.1 L/hr, and hexane solutions prepared by mixing triisobutylaluminum (TiBA: TOSOH FINECHEM CORPORATION) at a concentration of 5 mmol/L, [bis[4-(dimethylamino)phenyl]methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.04 L/hr and 0.4 L/hr (Total: 1.24 L/hr). At the same time, to another feed opening of the continuous polymerization reactor, ethylene at a flow rate of 5.0 kg/hr, butene-1 at a flow rate of 13.4 kg/hr and hydrogen at a flow rate of 120 NL/hr are continuously provided. Then, continuous solution polymerization is conducted under conditions wherein the polymerization temperature is 105° C., the total pressure is 3.0 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 4.1 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 11

To one of the feed openings of a 310 L volume pressurized continuous polymerization reactor equipped with a stirring blade and thoroughly purged with nitrogen, purified and dehydrated n-hexane is continuously introduced at a flow rate of 17.0 L/hr, and hexane solutions prepared by mixing triisobutylaluminum (TiBA: TOSOH FINECHEM CORPORATION) at a concentration of 5 mmol/L, [bis[4-(dimethylamino)phenyl]methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.16 L/hr and 1.6 L/hr (Total: 2.56 L/hr). At the same time, to another feed opening of the continuous polymerization reactor, ethylene at a flow rate of 5.4 kg/hr, butene-1 at a flow rate of 15.0 kg/hr and hydrogen at a flow rate of 107 NL/hr are continuously provided. Then, continuous solution polymerization is conducted under conditions wherein the polymerization temperature is 110° C., the total pressure is 2.8 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 6.5 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 12

To one of the feed openings of a 310 L volume pressurized continuous polymerization reactor equipped with a stirring blade and thoroughly purged with nitrogen, purified and dehydrated n-hexane is continuously introduced at a flow rate of 21.1 L/hr, and hexane solutions prepared by mixing triisobutylaluminum (TiBA: TOSOH FINECHEM CORPORATION) at a concentration of 10 mmol/L, [bis(4-methoxy-3-methylphenyl)methylene($\eta^5$-cyclopentadienyl)($\eta^5$-octamethyloctahydrodibenzofluorenyl)]hafnium dichloride at a concentration of 0.1 mmol/L and triphenylcarbeniumtetrakis(pentafluorophenyl)borate at a concentration of 0.035 mmol/L are continuously introduced at flow rates of 1.0 L/hr, 0.035 L/hr and 0.5 L/hr (Total: 1.535 L/hr). At the same time, to another feed opening of the continuous polymerization reactor, ethylene at a flow rate of 4.8 kg/hr, butene-1 at a flow rate of 10.1 kg/hr and hydrogen at a flow rate of 5.0 NL/hr are continuously provided. Then, continuous solution polymerization is conducted under conditions wherein the polymerization temperature is 95° C., the total pressure is 2.1 MPa–G (G=gauge pressure), and the stirring rotation frequency is 190 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.3 kg/hr in terms of the ethylene/butene-1 copolymer through an outlet equipped at the bottom of the polymerization reactor so that the average of solution amount in the polymerization reactor is kept at 105 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 13

To one of the feed openings of a 310 L volume pressurized continuous polymerization reactor equipped with a stirring blade and thoroughly purged with nitrogen, purified and dehydrated n-hexane is continuously introduced at a flow rate of 21.1 L/hr, and hexane solutions prepared by mixing triisobutylaluminum (TiBA: TOSOH FINECHEM CORPORATION) at a concentration of 10 mmol/L, [bis(4-methoxy-3-methylphenyl)methylene($\eta^5$-cyclopentadienyl)($\eta^5$-octamethyloctahydrodibenzofluorenyl)]hafnium dichloride at a concentration of 0.1 mmol/L and triphenylcarbeniumtetrakis(pentafluorophenyl)borate at a concentration of 0.035 mmol/L are continuously introduced at flow rates of 1.0 L/hr, 0.035 L/hr and 0.5 L/hr (Total: 1.535 L/hr). At the same time, to another feed opening of the continuous polymerization reactor, ethylene at a flow rate of 4.8 kg/hr, butene-1 at a flow rate of 10.1 kg/hr and hydrogen at a flow rate of 5.9 NL/hr are continuously provided. Then, continuous solution polymerization is conducted under conditions wherein the polymerization temperature is 95° C., the total pressure is 2.1 MPa–G (G=gauge pressure), and the stirring rotation frequency is 190 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.3 kg/hr in terms of the ethylene/butene-1 copolymer through an outlet equipped at the bottom of the polymerization reactor so that the average of solution amount in the polymerization reactor is kept at 105 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 14

To one of the feed openings of a 310 L volume pressurized continuous polymerization reactor equipped with a stirring blade and thoroughly purged with nitrogen, purified and dehydrated n-hexane is continuously introduced at a flow rate of 21.1 L/hr, and hexane solutions prepared by mixing triisobutylaluminum (TiBA: TOSOH FINECHEM CORPORATION) at a concentration of 10 mmol/L, [bis(4-methoxy-3-methylphenyl)methylene($\eta^5$-cyclopentadienyl)($\eta^5$-octamethyloctahydrodibenzofluorenyl)]hafnium dichloride at a concentration of 0.1 mmol/L and triphenylcarbeniumtetrakis(pentafluorophenyl)borate at a concentration of 0.035 mmol/L are continuously introduced at flow rates of 1.0 L/hr, 0.035 L/hr and 0.5 L/hr (Total: 1.535 L/hr). At the same time, to another feed opening of the continuous polymerization reactor, ethylene at a flow rate of 4.8 kg/hr, butene-1 at a flow rate of 10.0 kg/hr and hydrogen at a flow rate of 10.8 NL/hr are continuously provided. Then, continuous solution polymerization is conducted under conditions wherein the polymerization temperature is 95° C., the total pressure is 2.2 MPa–G (G=gauge pressure), and the stirring rotation frequency is 190 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.3 kg/hr in terms of the ethylene/butene-1 copolymer through an outlet equipped at the bottom of the polymerization reactor so that the average of solution amount in the polymerization reactor is kept at 105 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Example 15

To one of the feed openings of a 310 L volume pressurized continuous polymerization reactor equipped with a stirring blade and thoroughly purged with nitrogen, purified and dehydrated n-hexane is continuously introduced at a flow rate of 17.0 L/hr, and hexane solutions prepared by mixing triisobutylaluminum (TiBA: TOSOH FINECHEM CORPORATION) at a concentration of 5 mmol/L, [bis[4-dimethylamino]phenyl)methylene($\eta^5$-cyclopentadienyl)($\eta^5$-octamethyloctahydrodibenzofluorenyl)]hafnium dichloride at a concentration of 0.05 mmol/L and triphenylcarbeniumtetrakis(pentafluorophenyl)borate at a concentration of 0.025 mmol/L are continuously introduced at flow rates of 0.8 L/hr, 0.16 L/hr and 1.6 L/hr (Total: 2.56 L/hr). At the same time, to another feed opening of the continuous polymerization reactor, ethylene at a flow rate of 6.0 kg/hr, butene-1 at a flow rate of 15.0 kg/hr and hydrogen at a flow rate of 39 NL/hr are continuously provided. Then, continuous solution polymerization is conducted under conditions wherein the polymerization temperature is 115° C., the total pressure is 2.9 MPa–G (G=gauge pressure), and the stirring rotation frequency is 256 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/butene-1 copolymer which is produced by performing polymerization under the above-mentioned conditions is continuously withdrawn at a rate of 7.5 kg/hr in terms of the ethylene/butene-1 copolymer through an outlet equipped at the bottom of the polymerization reactor so that the average of solution amount in the polymerization reactor is kept at 30 L. The resultant polymerization solution is poured into a large amount of methanol so as to precipitate the ethylene/butene-1 copolymer. Then, the ethylene/butene-1 copolymer is dried under reduced pressure at 130° C. for 24 hours. The properties of the resulting polymer are shown in Table 2-1.

Comparative Example 1

To one of the feed openings of a 1 L volume pressurized continuous polymerization reactor equipped with a stirring blade and thoroughly purged with nitrogen, hexane solutions prepared with methylaluminoxane (MMAO-3A: TOSOH FINECHEM CORPORATION) at a concentration of 3.5 mmol/L, [dimethyl(t-butylamide)(tetramethyl-$\eta^5$-cyclopentadienyl)silane]titanium dichloride at a concentration of 0.05 mmol/L and triphenylcarbeniumtetrakis(pentafluorophenyl)borate at a concentration of 0.1 mmol/L are continuously introduced at flow rates of 0.2 L/hr, 0.064 L/hr and 0.036 L/hr, respectively. At the same time, to another feed opening of the continuous polymerization reactor, ethylene at a flow rate of 113 g/hr, butene-1 at a flow rate of 540 g/hr, and hydrogen at a flow rate of 0.45 NL/hr are continuously provided. Purified and dehydrated n-hexane is continuously introduced at a total flow rate of 1.41 L/hr through the above two feed openings and an opening at the top of the polymerization reactor, and continuous solution polymerization is conducted under conditions wherein the polymerization temperature is 100° C., the total pressure is 3.6 MPa–G, and the stirring rotation frequency is 800 rpm. Coolants are circulated through jackets equipped outside of the polymerization reactor, and thereby polymerization heat is removed.

The hexane solution comprising an ethylene/butene-1 copolymer which is produced by performing polymerization under the above-mentioned conditions is continuously withdrawn at a rate of 0.097 kg/hr in terms of the ethylene/butene-1 copolymer through an outlet equipped at the top of the polymerization reactor such that the pressure is maintained at 3.6 MPa–G. The resultant polymerization solution is poured into a large amount of methanol so as to precipitate the ethylene/butene-1 copolymer. Then, the ethylene/butene-1 copolymer is dried under reduced pressure at 130° C. for 1 hour. The properties of the resulting polymer are shown in Table 2-2.

Comparative Example 2

An ethylene/butene-1 copolymer is obtained in a similar manner to the method of Comparative Example 1 except that the flow rate of the hexane solution of [dimethyl(t-butylamide)(tetramethyl-$\eta^5$-cyclopentadienyl)silane]titanium dichloride is changed to 0.096 L/hr, that the flow rate of the hexane solution of triphenylcarbeniumtetrakis(pentafluorophenyl)borate is changed to 0.054 L/hr, and that the quantity of hydrogen is changed to 0.90 NL/hr. The properties of the resulting polymer are shown in Table 2-2.

Comparative Example 3

An ethylene/butene-1 copolymer is obtained in a similar manner to the method of Comparative Example 1 except that the flow rate of the hexane solution of [dimethyl(t-butylamide)(tetramethyl-$\eta^5$-cyclopentadienyl)silane]titanium dichloride is changed to 0.070 L/hr, that the flow rate of the hexane solution of triphenylcarbeniumtetrakis(pentafluorophenyl)borate is changed to 0.039 L/hr, that the flow rate of ethylene is changed to 75.2 g/hr, and that the quantity of hydrogen is changed to 0.25 NL/hr. The properties of the resulting polymer are shown in Table 2-2.

Comparative Example 4

An ethylene/butene-1 copolymer is obtained in a similar manner to the method of Comparative Example 1 except that the flow rate of the hexane solution of [dimethyl(t-butylamide)(tetramethyl-$\eta^5$-cyclopentadienyl)silane]titanium dichloride is changed to 0.16 L/hr, that the flow rate of the hexane solution of triphenylcarbeniumtetrakis(pentafluorophenyl)borate is changed to 0.085 L/hr, that the flow rate of ethylene is changed to 75.2 g/hr, and that the flow rate of butene-1 is changed to 480 g/hr. The properties of the resulting polymer are shown in Table 2-2.

Comparative Example 5

An ethylene/propylene copolymer is obtained according to the method of Polymerization Example 6 which is described in International Publication WO 2000/60032. The properties of the resulting polymer are shown in Table 2-2.

Comparative Example 6

An ethylene/propylene copolymer is obtained in a similar manner to the method of Comparative Example 5 except that the charged quantity of hydrogen is changed from 90 mL to 150 mL and that the polymerization time is changed from 5 minutes to 4 minutes. The properties of the resulting polymer are shown in Table 2-2.

Comparative Example 7

An ethylene/propylene copolymer is obtained in a similar manner to the method of Comparative Example 5 except that the charged quantity of hydrogen is changed from 90 mL to 200 mL and that the polymerization time is changed from 5 minutes to 4 minutes. The properties of the resulting polymer are shown in Table 2-2.

TABLE 2-1

|  |  | EX1 | Ex2 | EX3 | EX4 | EX5 | EX6 | EX7 | EX8 |
|---|---|---|---|---|---|---|---|---|---|
| Composition C2 | mol % | 59 | 64 | 69 | 61 | 62 | 68 | 63 | 62 |
| C4 | mol % | 41 | 36 | 31 | 39 | 39 | 32 | 37 | 38 |
| Tm | deg. C. | none | none | −30 | none | none | −37 | none | none |
| Tg | deg. C. | −69 | −70 | −72 | −69 | −69 | −72 | −71 | −71 |
| Intrinsic Viscosity | dl/g | 1.5 | 1.9 | 1.3 | 1.4 | 1.7 | 1.6 | 1.6 | 1.5 |
| Mw (PS standard) | — |  | 205000 | 273000 | 127000 | 187000 | 243000 | 207000 | 233000 | 212000 |
| Mw/Mn | — |  | 2.0 | 2.1 | 1.9 | 2.9 | 3.1 | 21 | 2.1 | 2.0 |
| Density | kg/m$^3$ | 861 | 859 | 859 | 860 | 880 | 859 | 860 | 860 |
| Pour Point | deg. C. | −45.0 |  | −45.0 | −42.5 | −37.5 |  |  |  |
| Kinematic Vis. (10 wt % in PAO-4) | mm$^2$/s | 409 |  | 202 | 300 | 604 |  |  |  |

|  |  | EX9 | EX10 | EX11 | EX12 | EX13 | EX14 | EX15 |
|---|---|---|---|---|---|---|---|---|
| Composition C2 | mol % | 61 | 63 | 64 | 63 | 63 | 64 | 65 |
| C4 | mol % | 39 | 37 | 36 | 37 | 37 | 36 | 35 |
| Tm | deg. C. | none | none | none | none | none | none | none |
| Tg | deg. C. | −70 | −71 | −71 | −70 | −71 | −70 | −72 |
| Intrinsic Viscosity | dl/g | 1.5 | 1.2 | 1.2 | 2.2 | 2.1 | 1.9 | 1.3 |
| Mw (PS standard) | — | 207000 | 143000 | 156000 | 332000 | 318000 | 279000 | 182000 |
| Mw/Mn | — |  | 2.1 | 2.3 | 2.8 | 2.3 | 2.3 | 2.3 | 2.2 |
| Density | kg/m$^3$ | 860 | 860 | 860 | 860 | 860 | 860 | 860 |
| Pour Point | deg. C. |  |  | −45.0 |  |  |  |  |
| Kinematic Vis. (10 wt % in PAO-4) | mm$^2$/s |  |  | 234 |  |  |  |  |

TABLE 2-2

|  |  | CE1 | CE2 | CE3 | CE4 | CE5 | CE6 | CE7 |
|---|---|---|---|---|---|---|---|---|
| Composition C2 | mol % | 81 | 82 | 76 | 74 | 57 | 52 | 55 |
| C3 | mol % | — | — | — | — | 43 | 48 | 45 |
| C4 | mol % | 19 | 18 | 25 | 26 | — | — | — |
| Tm | deg. C. | 11 and 32 | 17 and 42 | −7 | −20 and 6 | none | none | none |
| Tg | deg. C. | −64 | −64 | −69 | −70 | −62 | −58 | −59 |
| Intrinsic Viscosity | dl/g | 1.8 | 1.1 | 1.7 | 1.1 | 2.1 | 1.6 | 1.2 |
| Mw (PS standard) | — | 233000 | 110000 | 225000 | 123000 | 290000 | 203000 | 130000 |
| Mw/Mn | — |  |  |  | 2.0 |  | 2.2 |  |
| Density | kg/m$^3$ | 863 | 864 | 858 | 858 | 852 | 852 | 852 |
| Pour Point | deg. C. |  |  |  |  | −20.0 | −30.0 | −42.5 |
| Kinematic Vis. (10 wt % in PAO-4) | mm$^2$/s |  |  |  |  | 2855 | 1032 | 362 |

In Tables 2-1 and 2-2, the blanks indicate measurement not made or conditions not reported; "none" indicates no melting point detected; EX indicates Example; and CE indicates Comparative Example.

An engine oil (lubricating oil composition) is prepared containing a viscosity modifier for lubricating oils containing a copolymer obtained in any of Examples and Comparative Examples. Said lubricating oil composition contains the following components:

| API Group II Base oil | 90.43-90.73 (% by weight) |
|---|---|
| Additive* | 8.62 (% by weight) |
| Pour Point Depressant (polymethacrylate) | 0.25 (% by weight) |
| Copolymer | 0.4-0.7 (as indicated in Tables 3-1 and 3-2) (% by weight) |
| Total | 100.0 (% by weight) |

Note:
*Additive = a conventional GF-5 engine lubricant package including Ca and Na overbased detergents, N-containing dispersant, aminic and phenolic antioxidants, zinc dialkyldithiophosphates, friction modifier, and antifoam agent.

The viscosity modifier for lubricating oils is added as a concentrate in a Group II oil. The solid polymer contents (copolymer basis, absent diluent oil) are shown in Tables 3-1 and 3-2. The lubricating oil composition is subjected to the tests.

[Table 3-1]

TABLE 3-1

| Copolymer | unit | Ex16 Ex1 | Ex17 Ex2 | Ex18 Ex3 | Ex19 Ex4 | Ex20 Ex5 | Ex21 Ex6 | Ex22 Ex7 |
|---|---|---|---|---|---|---|---|---|
| Amount | wt % | 0.62 | 0.55 | 0.73 | 0.64 | 0.53 | 0.60 | 0.55 |
| KV @100 deg. C. | mm$^2$/s | 9.66 | 9.94 | 9.37 | 9.67 | 9.95 | 9.72 | 9.71 |
| HTHS @150 deg. C. | mPa·s | 2.9 | 2.9 | 2.9 | 2.9 | 2.9 | 2.9 | 2.9 |
| MRV @−35 deg. C. | mPa·s | 17462 | 17654 | 17484 | 18010 | 18565 | 18024 | 18197 |
| Yield Stress | Pa | <35 | <35 | <35 | <35 | <35 | <35 | <35 |
| CCS @−30 deg C. | mPa·s | 5814 | 5772 | 6124 | 5995 | 5962 | 5895 | 5837 |
| SSI | % | 44.1 | 51.7 | 24.9 | 38.1 | 49.2 | 39.8 | 48.3 |
| Low Temperature Storage Stability Test, Evaluation of Insolubles | — | AA | AA | AA | AA | AA | AA | AA |

| Copolymer | unit | Ex23 Ex8 | Ex24 Ex9 | Ex25 Ex10 | Ex26 Ex11 | Ex27 Ex12 | Ex28 Ex13 | Ex29 Ex14 |
|---|---|---|---|---|---|---|---|---|
| Amount | wt % | 0.60 | 0.63 | 0.73 | 0.70 | 0.42 | 0.41 | 0.50 |
| KV @100 deg. C. | mm$^2$/s | 9.69 | 9.70 | 9.36 | 9.42 | 9.77 | 9.69 | 9.58 |
| HTHS @150 deg. C. | mPa·s | 2.9 | 2.9 | 2.9 | 2.9 | 2.9 | 2.9 | 2.9 |
| MRV @−35 deg. C. | mPa·s | 17507 | 18100 | 17393 | 17494 | 18446 | 18773 | 18507 |
| Yield Stress | Pa | <35 | <35 | <35 | <35 | <35 | <35 | <35 |
| CCS @−30 deg. C. | mPa·s | 5893 | 5799 | 6028 | 6000 | 5580 | 5578 | 5697 |
| SSI | % | 44.3 | 42.5 | 25.9 | 28.8 | 59.2 | 56.5 | 50.9 |
| Low Temperature Storage Stability Test, Evaluation of Insolubles | — | AA | AA | AA | AA | AA | AA | AA |

TABLE 3-2

| Copolymer | unit | CE8 CE1 | CE9 CE2 | CE10 CE3 | CE11 CE4 | CE12 CE7 | CE13 CE6 | CE14 CE5 |
|---|---|---|---|---|---|---|---|---|
| Amount | wt % | 0.46 | 0.66 | 0.48 | 0.67 | 0.48 | 0.57 | 0.68 |
| KV @100 deg. C. | mm$^2$/s | 9.65 | 9.23 | 9.58 | 9.25 | 9.94 | 9.77 | 9.42 |
| HTHS @150 deg. C. | mPa·s | 2.9 | 2.9 | 2.9 | 2.9 | 2.9 | 2.9 | 2.9 |
| MRV @−35 deg. C. | mPa·s | 90881 | 55062 | >400000 | >400000 | 19192 | 18800 | 17879 |
| Yield Stress | Pa | <280 | <175 | >350 | >350 | <35 | <35 | <35 |
| CCS @−30 deg. C. | mPa·s | 5356 | 5512 | 5470 | 5604 | 5941 | 5982 | 6165 |
| SSI | % | 41.5 | 18.8 | 43.1 | 22.8 | 42.0 | 36.1 | 20.9 |
| Low Temperature Storage Stability Test, Evaluation of Insolubles | — | BB | BB | BB | BB | AA | AA | AA |

Each abbreviation in Tables 3-1 and 3-2 is indicated below.
KV100=kinematic viscosity at 100° C.
HTHS=high temperature high shear viscosity
MRV=Mini-Rotary viscosity
CCS=cold cranking simulator viscosity
SSI: shear stability index as determined by ASTM D 6278_30
EX=Example
CE=Comparative Example It will be evident that when formulations are formed as lubricating oil compositions to have similar HTHS viscosities and the lubricating oil compositions having similar SSIs are compared, MRV is lowered by the lubricating oil composition of the present invention. This is shown in FIG. 1. FIG. 1 is a plot of the MRV of a composition, determined by extrapolation or interpolation from three measurement data, with the proviso that HTHS viscosity is 2.90 mPa·s, as a function of SSI determined in the same manner. The points plotted with "◇" are made by plotting the points in Examples 16 to 29. Further, the points plotted with "□" are made by plotting the points in Comparative Examples 12 to 14.

It will be evident that when formulations are formed as lubricating oil compositions to have similar HTHS viscosities and the lubricating oil compositions having similar SSIs are compared, the kinematic viscosity (KV) at 100° C. is lowered by the lubricating oil composition of the present invention. This is shown in FIG. 2. FIG. 2 is a plot of the kinematic viscosity (KV) at 100° C. of a composition, determined by extrapolation or interpolation from three measurement data, with the proviso that HTHS viscosity is 2.90 mPa·s, as a function of SSI determined in the same manner. The points plotted with "◇" are made by plotting the points in Examples 16 to 29. Further, the points plotted with "□" are made by plotting the points in Comparative Examples 12 to 14.

It will be evident that when formulations are formed as lubricating oil compositions to have similar HTHS viscosities and copolymers in the lubricating oil compositions having similar SSIs are compared, the pour point of a polymer solution having a concentration of 10% by weight in a PAO-4 solvent is low as compared to a conventional copolymer. This is shown in FIG. 3. FIG. 3 is a plot of the pour point of a polymer solution having a concentration of 10% by weight in a PAO-4 solvent, as a function of SSI of a composition, determined by extrapolation or interpolation from three measurement data, with the proviso that HTHS viscosity is 2.90 mPa·s. The points plotted with "◇" are made by plotting the points in Examples 1, 3 to 5, and 11. Further, the points plotted with "□" are made by plotting the points in Comparative Examples 5 to 7.

It will be evident that when formulations are formed as lubricating oil compositions to have similar HTHS viscosities and copolymers in the lubricating oil compositions having similar SSIs are compared, the kinematic viscosity (Kinematic Vis.) at 100° C. of said copolymer is low as compared to a conventional copolymer. This is shown in FIG. 4. FIG. 4 is a plot of the kinematic viscosity (Kinematic Vis.) at 100° C. of a polymer solution having a concentration of 10% by weight in a PAO-4 solvent, as a function of SSI of a composition, determined by extrapolation or interpolation from three measurement data, with the proviso that HTHS viscosity is 2.90 mPa·s. The points plotted with "◊" are made by plotting the points in Examples 1, 3 to 5, and 11. Further, the points plotted with "□" are made by plotting the points in Comparative Examples 5 to 7.

FIG. 5 is a plot of the MRV of a composition, determined by extrapolation or interpolation from three measurement data, with the proviso that HTHS viscosity is 2.90 mPa·s, as a function of SSI determined in the same manner. It will be evident from said figure that in comparison of lubricating oil compositions having similar HTHS viscosities and SSIs, the MRVs of Comparative Examples are greatly deteriorated and are not useful for lubricating oil compositions. The points plotted with "◊" are made by plotting the points in Examples 16 to 29. Further, the points plotted with "□" are made by plotting the points in Comparative Examples 8 to 11.

The lubricating oil composition of the present invention has low MRV and kinematic viscosity as compared to a conventional composition having similar HTHS viscosity and SSI. Therefore, the fuel efficiency of an automobile or the like can be improved by using the composition of the present invention.

Further, the additive composition for lubricating oils of the present invention has a low kinematic viscosity as compared to a conventional additive composition for lubricating oils in the case of being made into a lubricating oil composition having similar SSI. Therefore, the additive composition for lubricating oils of the present invention can contribute to improvement of the efficiency of workability and the transportability as well as to reduction of the energy consumption of production facilities.

What is claimed is:

1. A viscosity modifier for lubricating oils comprising an ethylene-α-olefin copolymer (A) which comprises 31 to 50 mole % of structural units derived from 1-butene and 50 to 69 mole % of structural units derived from ethylene (with the proviso that the total of all structural units of said copolymer is 100 mole %) and which satisfies the following requirements (a), (b), and (c):
    (a): a glass transition temperature (Tg) as measured by differential scanning calorimetry (DSC) is in a range of −75 to −65° C.;
    (b): a melting point (Tm) as measured by differential scanning calorimetry (DSC) is not substantially observed or is not a melting point (Tm) of −25° C. or more; and
    (c): intrinsic viscosity [η] as measured in a decalin solvent at 135° C. is 1.0 to 2.8 dl/g,
    wherein the ethylene-α-olefin copolymer (A) is 0.1 to 5% by weight in 100% by weight of the lubricating oil composition.

2. The viscosity modifier for lubricating oils according to claim 1, wherein the weight average molecular weight of the ethylene-α-olefin copolymer (A) is 100,000 to 400,000 as measured by gel permeation chromatography (GPC).

3. An additive composition for lubricating oils comprising the viscosity modifier for lubricating oils according to claim 1 and an oil (B),
    wherein the additive composition for lubricating oils comprises the ethylene-α-olefin copolymer (A) and the oil (B) at a weight ratio (A)/(B) of 1/99 to 50/50.

4. The lubricating oil composition according to claim 1, wherein a pour-point depressant (C) is contained in an amount of 0.05 to 5% by weight in 100% by weight of said lubricating oil composition.

\* \* \* \* \*